(12) United States Patent
Aiba et al.

(10) Patent No.: US 9,754,606 B2
(45) Date of Patent: Sep. 5, 2017

US009754606B2

(54) PROCESSING APPARATUS, PROCESSING METHOD, PROGRAM, COMPUTER READABLE INFORMATION RECORDING MEDIUM AND PROCESSING SYSTEM

(71) Applicants: Akihito Aiba, Kanagawa (JP); Junichi Takami, Kanagawa (JP)

(72) Inventors: Akihito Aiba, Kanagawa (JP); Junichi Takami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 13 days.

(21) Appl. No.: 14/391,281

(22) PCT Filed: Apr. 19, 2013

(86) PCT No.: PCT/JP2013/062305
§ 371 (c)(1),
(2) Date: Oct. 8, 2014

(87) PCT Pub. No.: WO2013/164981
PCT Pub. Date: Nov. 7, 2013

(65) Prior Publication Data

US 2015/0098587 A1 Apr. 9, 2015

(30) Foreign Application Priority Data

May 1, 2012 (JP) ................................ 2012-104573
Feb. 22, 2013 (JP) ................................ 2013-032959

(51) Int. Cl.
*H04B 15/00* (2006.01)
*G10L 21/0332* (2013.01)
*G10L 21/0208* (2013.01)

(52) U.S. Cl.
CPC ...... *G10L 21/0332* (2013.01); *G10L 21/0208* (2013.01)

(58) Field of Classification Search
CPC ........................ G10L 21/0332; G10L 21/0208
See application file for complete search history.

(56) References Cited

U.S. PATENT DOCUMENTS 5,212,764 A 5/1993 Ariyoshi
2005/0119882 A1* 6/2005 Bou-Ghazale ...... G10L 21/0208 704/227

(Continued)

FOREIGN PATENT DOCUMENTS

CN 102348150 A 2/2012
CN 102411930 A 4/2012

(Continued)

OTHER PUBLICATIONS

International Search Report Issued on May 28, 2013 in PCT/JP2013/062305 filed on Apr. 19, 2013.

(Continued)

*Primary Examiner* — Andrew L Sniezek
(74) *Attorney, Agent, or Firm* — Oblon, McClelland, Maier & Neustadt, L.L.P.

(57) ABSTRACT

A processing apparatus estimates a noise amplitude spectrum of noise included in a sound signal. The processing apparatus includes an amplitude spectrum calculation part configured to calculate an amplitude spectrum of the sound signal for each one of frames obtained from dividing the sound signal into units of time; and a noise amplitude spectrum estimation part configured to estimate the noise amplitude spectrum of the noise detected from the frame. The noise amplitude spectrum estimation part includes a first estimation part configured to estimate the noise amplitude spectrum based on a difference between the amplitude spectrum calculated by the amplitude spectrum calculation part and the amplitude spectrum of the frame occurring before the noise is detected, and a second estimation part configured to estimate the noise amplitude spectrum based (Continued)

on an attenuation function obtained from noise amplitude spectra of the frames occurring after the noise is detected.

11 Claims, 16 Drawing Sheets

(56) References Cited

U.S. PATENT DOCUMENTS

| | | | | |
|---|---|---|---|---|
| 2005/0152563 A1* | 7/2005 | Amada | G10L 21/0208 | 381/94.1 |
| 2005/0256705 A1* | 11/2005 | Kazama | G10L 21/0208 | 704/226 |
| 2006/0025992 A1* | 2/2006 | Oh | G11B 20/24 | 704/226 |
| 2010/0014681 A1 | 1/2010 | Sugiyama | | |
| 2010/0104113 A1* | 4/2010 | Liu | G10L 21/0208 | 381/94.2 |
| 2011/0123045 A1 | 5/2011 | Tasaki et al. | | |
| 2012/0020495 A1 | 1/2012 | Sekiya | | |
| 2012/0095755 A1* | 4/2012 | Otani | G10L 21/0208 | 704/205 |

FOREIGN PATENT DOCUMENTS

| | | |
|---|---|---|
| JP | H02-278298 | 11/1990 |
| JP | 2000-105599 | 4/2000 |
| JP | 3310225 | 8/2002 |
| JP | 3451146 | 9/2003 |
| JP | 3484112 | 1/2004 |
| JP | 2007-027897 | 2/2007 |
| JP | 2010-160246 | 7/2010 |
| JP | 2011-186384 | 9/2011 |
| JP | 2011-257643 | 12/2011 |
| WO | WO99/050825 | 10/1999 |
| WO | WO 2005/114656 A1 | 12/2005 |
| WO | WO2008/111462 | 9/2008 |

OTHER PUBLICATIONS

Extended European Search Report issued on Mar. 27, 2015 in Patent Application No. 13784344.7.

Combined Chinese Office Action and Search Report issued Jun. 29, 2016 in Patent Application No. 201380030900.4 (with English language translation).

* cited by examiner

PROCESSING APPARATUS, PROCESSING METHOD, PROGRAM, COMPUTER READABLE INFORMATION RECORDING MEDIUM AND PROCESSING SYSTEM

TECHNICAL FIELD

The present invention relates to a processing apparatus, a processing method, a program, a computer readable information recording medium and a processing system.

BACKGROUND ART

There are, for example, electronic apparatuses such as a video camera, a digital camera, an IC recorder and so forth, and a conference system for transmitting/receiving sound and so forth among apparatuses/devices via a network and carrying out a conference, each employing a technology of reducing noise from sounds recorded, transmitted and/or received so that the sounds can be heard clearly.

As a method of reducing noise from an inputted sound, a noise suppression apparatus or the like is known, for example, by which a noise suppressed sound is obtained as an output from a noise mixed sound as an input using a spectrum subtraction method (for example, see Japanese Laid-Open Patent Application No. 2011-257643).

According to the above-mentioned spectrum subtraction method, it is possible to reduce a constantly generated noise such as a sound from an air conditioner, for example. However, there is a case where it is difficult to reduce various types of suddenly generated noise such as, for example, a sound generated from hitting a keyboard of a personal computer, a sound generated from hitting a desk or a sound generated from clicking the top of a ball point pen.

SUMMARY OF INVENTION

According to one aspect of the present invention, a processing apparatus which estimates a noise amplitude spectrum of noise included in a sound signal has an amplitude spectrum calculation part configured to calculate an amplitude spectrum of the sound signal for each one of frames obtained from dividing the sound signal into units of time; and a noise amplitude spectrum estimation part configured to estimate a noise amplitude spectrum of the noise detected from the frame. The noise amplitude spectrum estimation part includes a first estimation part and a second estimation part. The first estimation part is configured to estimate the noise amplitude spectrum based on a difference between the amplitude spectrum calculated by the amplitude spectrum calculation part and the amplitude spectrum of the frame occurring before the noise is detected. The second estimation part is configured to estimate the noise amplitude spectrum based on an attenuation function obtained from the noise amplitude spectra of the frames occurring after the noise is detected.

Other objects, features and advantages of the present invention will become more apparent from the following detailed description when read in conjunction with the accompanying drawings.

DESCRIPTION OF EMBODIMENTS

Figure 1:
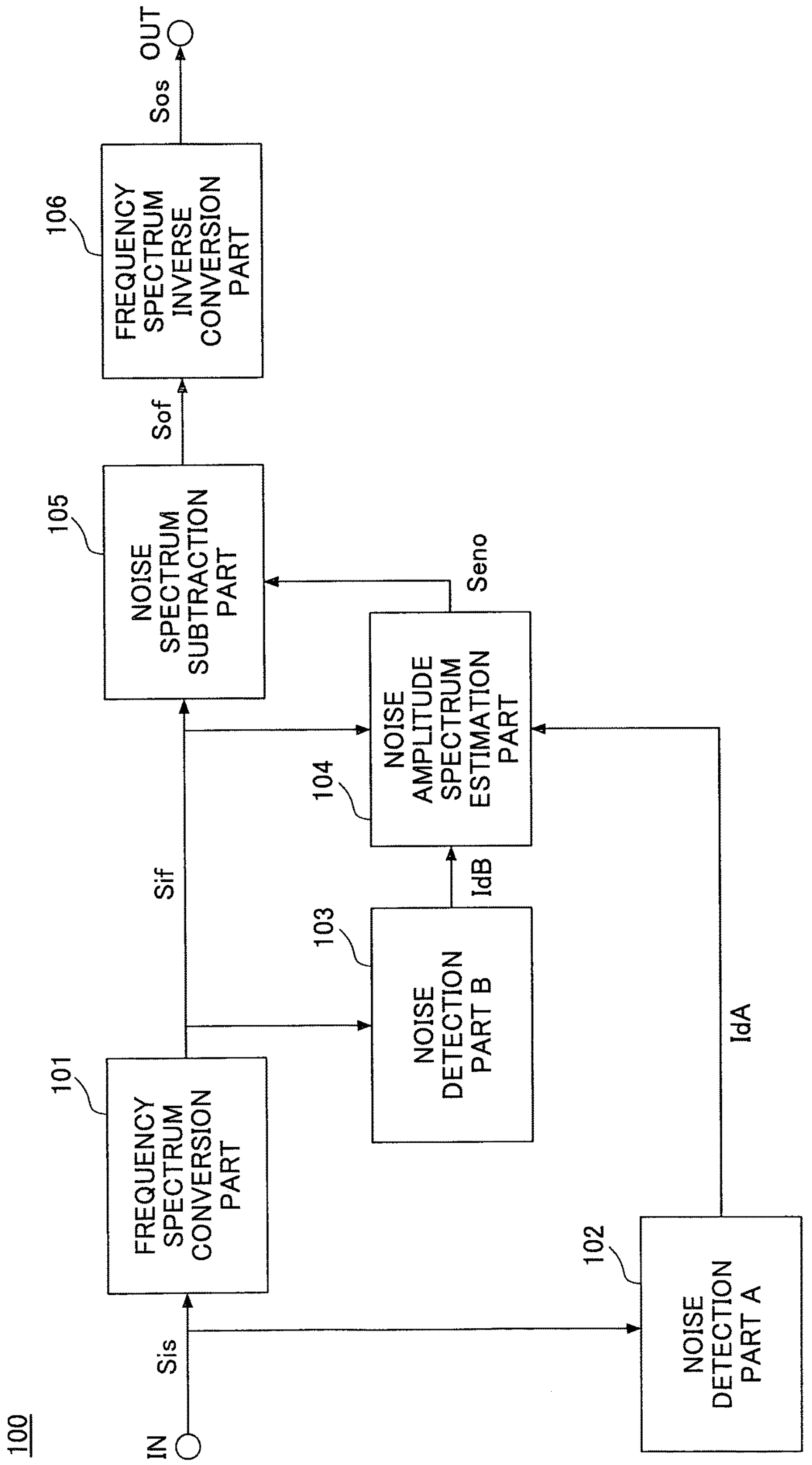
FIG. 1 is a block diagram illustrating a functional configuration of a processing apparatus according to a first embodiment.

Below, embodiments of the present invention will be described using figures. In the respective figures, the same reference numerals/letters are given to the same elements/components, and duplicate description may be omitted.

First Embodiment

<Functional Configuration of Processing Apparatus>

FIG. 1 is a block diagram illustrating a functional configuration of a processing apparatus 100 according to a first embodiment.

As shown in FIG. 1, the processing apparatus 100 includes an input terminal IN, a frequency spectrum conversion part 101, a noise detection part A 102, a noise detection part B 103, a noise amplitude spectrum estimation part 104, a noise spectrum subtraction part 105, a frequency spectrum inverse conversion part 106 and an output terminal OUT.

Figure 2:
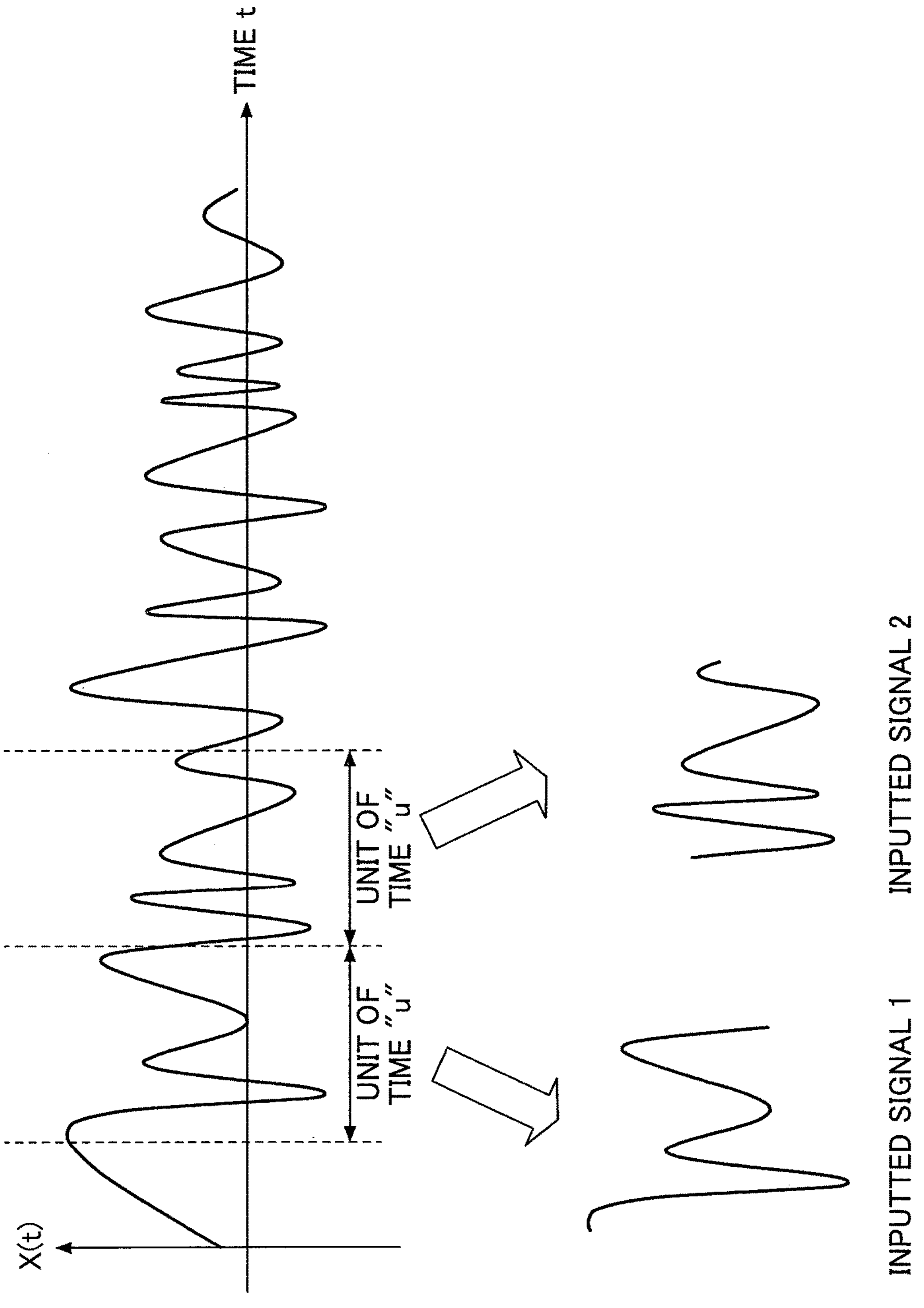
FIG. 2 illustrates a sound signal inputted to the processing apparatus according to the first embodiment.

A sound signal is inputted to the input terminal IN of the processing apparatus 100. As shown in FIG. 2, the sound signal Sis divided into respective units of time "u" (for example, each unit of time "u" being 10 ms or the like) is inputted to the input terminal IN. It is noted that hereinafter, the segments into which the sound signal Sis is divided into respective units of time "u" will be referred to as "frames". It is noted that the sound signal Sis is a signal corresponding to a sound inputted via an input device such as, for example, a microphone, for inputting a sound, and may include a sound other than voice.

The frequency spectrum conversion part 101 converts the sound signal Sis inputted to the input terminal IN into a frequency spectrum, and outputs the frequency spectrum Sif. The frequency spectrum conversion part 101 converts the sound signal into the frequency spectrum using, for example, fast Fourier transform (FFT).

The noise detection part A 102 determines whether noise is included in the inputted sound signal Sis, and outputs the noise detection result to the noise amplitude spectrum estimation part 104 as detection information A IdA.

The noise detection part B 103 determines whether noise is included in the frequency spectrum Sif outputted from the frequency spectrum conversion part 101, and outputs the noise detection result to the noise amplitude spectrum estimation part 104 as detection information B IdB.

The noise amplitude spectrum estimation part 104 estimates an amplitude spectrum Seno of noise (hereinafter, referred to as a "noise amplitude spectrum") included in the frequency spectrum Sif outputted from the frequency spectrum conversion part 101 based on the detection information A IdA outputted from the noise detection part A 102 and the detection information B IdB outputted from the noise detection part B 103.

The noise spectrum subtraction part 105 subtracts the noise amplitude spectrum Seno outputted from the noise amplitude spectrum estimation part 104 from the frequency spectrum Sif outputted from the frequency spectrum conversion part 101, and outputs the frequency spectrum Sof in which the noise has been thus reduced.

The frequency spectrum inverse conversion part 106 converts the frequency spectrum Sof in which the noise has been thus reduced outputted from the noise spectrum subtraction part 105 into a sound signal Sos, and outputs the sound signal Sos. The frequency spectrum inverse conversion part 106 converts the frequency spectrum Sof into the sound signal Sos using, for example, a Fourier inverse transform.

The output terminal OUT outputs the sound signal Sos in which the noise has been thus reduced outputted from the frequency spectrum inverse conversion part 106.

<Hardware Configuration of Processing Apparatus>

Figure 3:
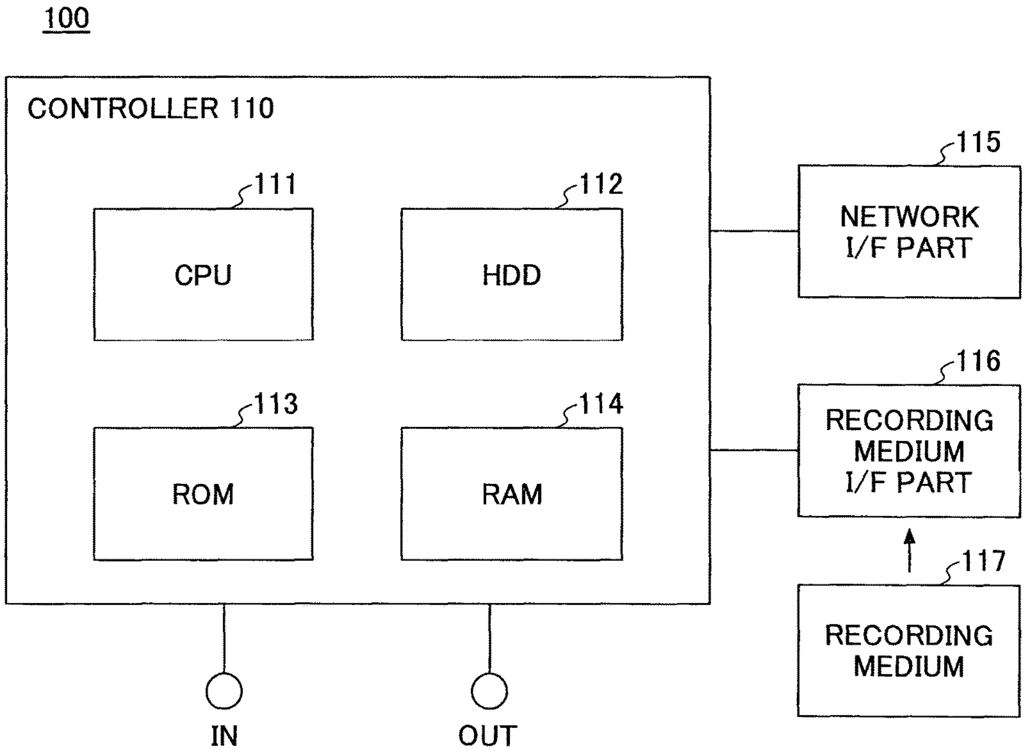
FIG. 3 illustrates a hardware configuration of the processing apparatus according to the first embodiment.

FIG. 3 illustrates a hardware configuration of the processing apparatus 100.

As shown in FIG. 3, the processing apparatus 100 includes a controller 110, a network I/F 115, a recording medium I/F part 116, an input terminal IN, and an output terminal OUT. The controller 110 includes a CPU 111, a HDD (Hard Disk Drive) 112, a ROM (Read Only Memory) 113 and a RAM (Random Access Memory) 114.

The CPU 111 includes an arithmetic and logic unit, reads a program and data from a storage device such as the HDD 112 or ROM 113 into the RAM 114, executes processes, and thus, realizes the respective functions of the processing apparatus 100. The CPU 111 thus functions as or function as parts of the frequency spectrum conversion part 101, noise detection part A 102, noise detection part B 103, noise amplitude spectrum estimation part 104, noise spectrum subtraction part 105, frequency spectrum inverse conversion part 106 (shown in FIG. 1) and so forth.

The HDD 112 is a non-volatile storage device storing programs and data. The stored programs and data include an OS (Operating System) that is basic software controlling the entirety of the processing apparatus 100, application software providing various functions on the OS, and so forth. The HDD 112 functions as an amplitude spectrum storage part 45, a noise amplitude spectrum storage part 46 (described later) and so forth.

The ROM 113 is a non-volatile semiconductor memory (storage device) that has a capability of storing programs and data even after power supply is turned off. The ROM 113 stores programs and data such as a BIOS (Basic Input/Output System) to be executed when the processing apparatus 100 is started up, OS settings, network settings and so forth. The RAM 114 is a volatile semiconductor memory (storage device) for temporarily storing programs and data.

The network I/F part 115 is an interface between a peripheral device having a communication function, connected via a network built by a data transmission path such as a wired and/or wireless circuit, such as a LAN (Local Area Network), a WAN (Wide Area Network) or the like, and the processing apparatus 100.

The recording medium I/F part 116 is an interface for a recording medium. The processing apparatus 100 has a capability of reading and/or writing information from/to a recording medium 117 using the recording medium I/F part 116. Specific examples of the recording medium 117 include a flexible disk, a CD, a DVD (Digital Versatile Disk), a SD memory card and a USB memory (Universal Serial Bus memory).

<Sound Processing of Processing Apparatus>

Next, sound processing carried out by the respective parts of the processing apparatus 100 will be described in detail.

<<Noise Detection from Inputted Sound Signal>>

The noise detection part A 102 (see FIG. 1) determines whether the inputted sound signal Sis includes noise based on, for example, a power fluctuation of the inputted sound signal Sis. In this case, the noise detection part A 102 calculates the power of the inputted sound signal Sis for each frame, and calculates the difference between the power of the frame (noise detection target frame) for which it is to be determined whether noise is included and the power of the frame occurring immediately before the noise detection target frame.

The power "p" of the inputted sound signal at the frame between times t1 and t2 can be obtained from the following formula (1) where x(t) denotes the value of the inputted sound signal at a time t:

$$p=\int_{t1}^{t2} x(t)^2 dt \tag{1}$$

The power fluctuation can be obtained from the following formula (2) where "$p_k$" denotes the power of the noise detection target frame and "$p_{k-1}$" denotes the power of the frame occurring immediately before the noise detection target frame:

$$\Delta p_k = p_k - p_{k-1} \tag{2}$$

The noise detection part A 102 compares, for example, the power fluctuation $\Delta p_k$ obtained from the formula (2) with a predetermined threshold, and determines that noise is included in the inputted sound signal Sis at the noise detection target frame when the power fluctuation $\Delta p_k$ exceeds the threshold, and no noise is included in the inputted sound signal Sis at the noise detection target frame when the power fluctuation $\Delta p_k$ does not exceed the threshold. The noise detection part A 102 outputs the detection information A IdA indicating the determination result.

Alternatively, the noise detection part A 102 may determine whether noise is included in the inputted sound signal based on, for example, the magnitude of a linear predictive error. In this case, the noise detection part A 102 calculates the linear predictive error of the detection target frame, as follows:

For example, the values x of the respective frames of the inputted sound signal will be expressed as follows:

$$\ldots, x_{k-1}, x_k, x_{k+1}, \ldots$$

At this time, the optimum linear predictive coefficients $a_n$ (n=0 to N−1) are obtained, to be used for predicting the value $x_{k+1}$ of the sound signal at a certain frame using the values $x_1$ to $x_k$ of the frames up to the frame occurring immediately before the certain frame by the following formula:

$$x\hat{}_{k+1}=a_0x_k+a_1x_{k-1}a_2x_{k-2}+\ldots+a_{N-1}x_{k-(N-1)}$$

Next, the linear predictive error $e_{k+1}$ is obtained by the following formula as the difference between the predicted value $x\hat{}_{k+1}$ thus obtained from the above formula and the actual value $x_{k+1}$:

$$e_{k+1}=x\hat{}_{k+1}-x_{k+1}$$

This error indicates the error between the predicted value and the actually measured value. Thus, the noise detection part A 102 compares the linear predictive error $e_{k+1}$ with a predetermined threshold, and determines that noise is included in the inputted sound signal Sis at the noise detection target frame when the linear predictive error $e_{k+1}$ exceeds the threshold, and no noise is included in the inputted sound signal Sis at the noise detection target frame when the linear predictive error $e_{k+1}$ does not exceed the threshold. The noise detection part A 102 outputs the detection information A IdA indicating the determination result.

<<Noise Detection from Frequency Spectrum>>

The noise detection part B 103 determines whether noise is included in the frequency spectrum Sif outputted from the frequency spectrum conversion part 101.

For example, the noise detection part B 103 determines whether noise is included in the frequency spectrum Sif based on the magnitude of a power fluctuation of a certain frequency band of the frequency spectrum Sif. In this case, the noise detection part B 103 calculates the sum total of the power of the spectrum in a high frequency band of the detection target frame, and obtains the difference between the thus obtained value of the detection target frame and the corresponding value of the frame occurring immediately before the detection target frame.

Then, for example, the noise detection part B 103 compares the thus obtained difference of the sum total of the power of the spectrum in the high frequency band between the detection target frame and the frame occurring immediately before the detection target frame with a predetermined threshold. Then, for example, the noise detection part B 103 determines that noise is included in the inputted sound signal Sis at the noise detection target frame when the difference of the sum total of the power of the spectrum in the high frequency band exceeds the threshold, and no noise is included in the inputted sound signal Sis at the noise detection target frame when the difference of the sum total of the power of the spectrum in the high frequency band does not exceed the threshold. The noise detection part B 103 outputs the detection information B IdB indicating the determination result.

Alternatively, the noise detection part B 103 may determine whether noise is included in the frequency spectrum by a comparison with a feature amount that has been statistically modeled for each frequency of noise to be detected. In this case, the noise detection part B 103 can detect noise using, for example, a MFCC (Mel. Frequency Cepstrum Coefficient) and a noise model.

MFCC is a feature amount considering the nature of the sense of hearing of human beings, and is well used in voice recognition or the like. A calculation procedure of MFCC includes, for a frequency spectrum obtained from FFT, (1) obtaining the absolute value; (2) carrying out filtering using a filter bank having equal intervals in Mel scale (a scale of pitch of a sound according to the sense of hearing of human beings), and obtaining the sum of the spectra of the respective frequency bands; (3) calculating the logarithm; (4) carrying out discrete cosine transform (DCT); and (5) extracting low order components.

The noise model is one obtained from modeling a feature of noise. For example, a feature of noise is modeled using a Gaussian Mixture Model (GMM) or the like, and the parameters thereof are estimated using feature amounts (for example, MFCC) extracted from a previously collected noise database. In a case of GMM, weights, averages, covariance and/or the like of respective multidimensional Gaussian distributions are used as the model parameters.

The noise detection part B 103 extracts MFCC of the inputted frequency spectrum Sif, and calculates the likelihood of the noise model. The likelihood of the noise model indicates the likelihood that the extracted MFCC corresponds to the noise model. That is, as the likelihood of the noise model is higher, the likelihood that the inputted sound signal corresponds to the noise is higher.

The likelihood L can be obtained from the following formula (3) in the case where the process is carried out for GMM:

$$L=\sum_{k=0}^{k-1} W_k N_k(x) \tag{3}$$

Here, x denotes the vector of MFCC, $W_k$ denotes the weight of the k-th distribution, and $N_k$ denotes the k-th multidimensional Gaussian distribution. The noise detection part B 103 obtains the likelihood L from the formula (3). Then, for example, when the obtained likelihood L is greater than a predetermined threshold, the noise detection part B 103 determines that noise is included in the inputted sound signal at the detection target frame. On the other hand, when the obtained likelihood L is less than or equal to the predetermined threshold, the noise detection part B 103 determines that no noise is included in the inputted sound signal at the detection target frame. Then, the noise detection part B 103 outputs the detection information B IdB indicating the determination result.

It is noted that by the processing apparatus 100 according to the first embodiment, detection of noise is carried out by the two noise detection parts, i.e., the noise detection part A 102 and the noise detection part B 103. However, an embodiment of the present invention is not limited thereto. The detection of noise may be carried out by either one thereof, or may be carried out by three or more of noise detection parts instead of the two thereof.

<<Estimation of Noise Amplitude Spectrum>>

Next, a method of estimating a noise amplitude spectrum by the noise amplitude spectrum estimation part 104 will be described.

Figure 4:
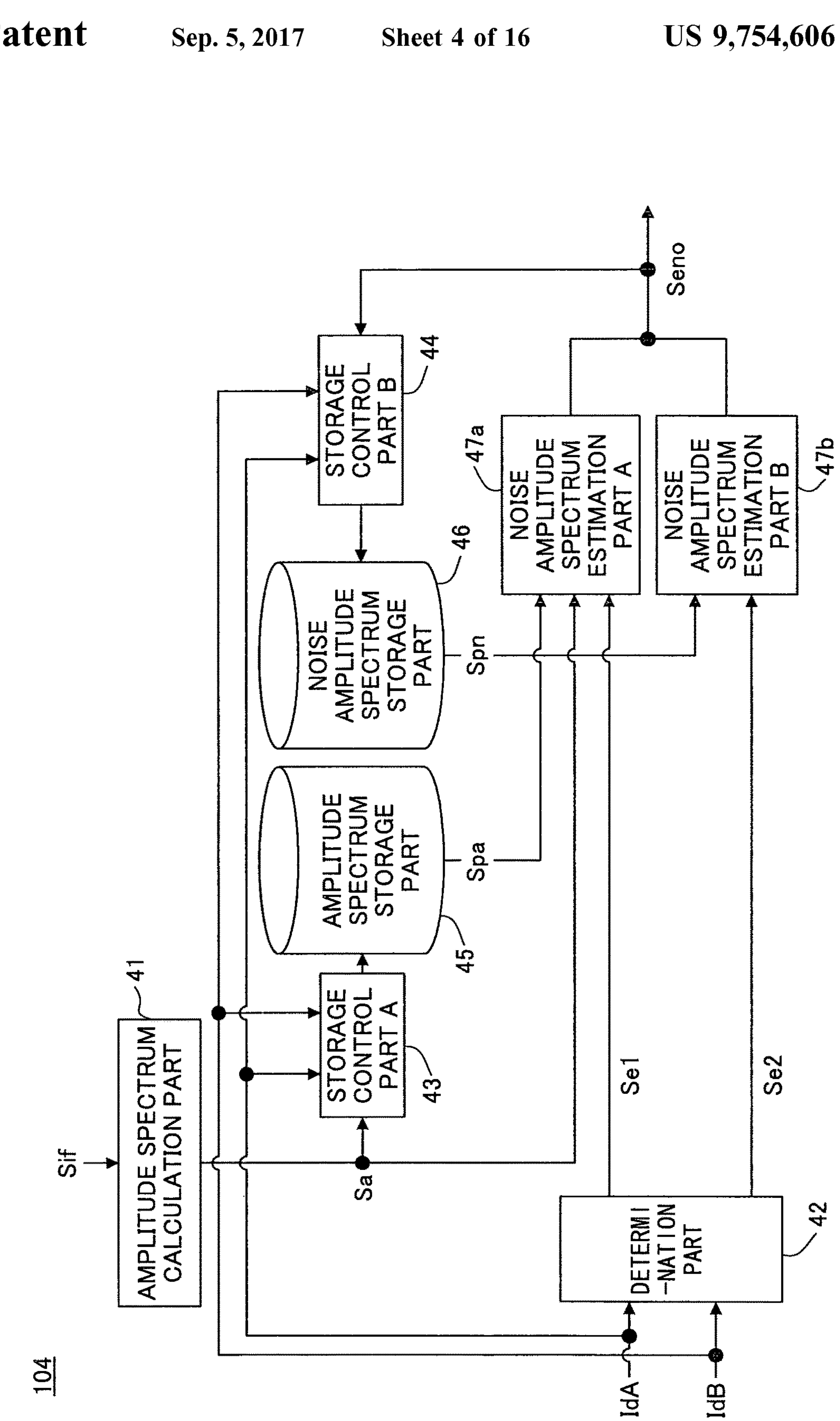
FIG. 4 is a block diagram illustrating a functional configuration of a noise amplitude spectrum estimation part of the processing apparatus according to the first embodiment.

FIG. 4 illustrates a functional configuration of the noise amplitude spectrum estimation part 104 according to the first embodiment.

As shown in FIG. 4, the noise amplitude spectrum estimation part 104 includes an amplitude spectrum calculation part 41, a determination part 42, a storage control part A 43, a storage control part B 44, an amplitude spectrum storage part 45, a noise amplitude spectrum storage part 46, a noise amplitude spectrum estimation part A 47*a* and a noise amplitude spectrum estimation part B 47*b*.

The amplitude spectrum calculation part 41 calculates an amplitude spectrum Sa from the frequency spectrum Sif obtained from converting the inputted sound signal Sis by the frequency spectrum conversion part 101, and outputs the amplitude spectrum Sa. The amplitude spectrum calculation part 41, for example, calculates an amplitude spectrum A from a frequency spectrum X (complex number) of a certain frequency by the following formula (4):

$$A=\sqrt{\{Re(X)\}^2+\{Im(X)\}^2} \quad (4)$$

To the determination part 42, the detection information A IdA from the noise detection part A 102 and the detection information B IdB from the noise detection part B 103 are inputted, and, based on the detection information A IdA and the detection information B IdB, the determination part 42 outputs an execution signal 1 Se1 to the noise amplitude spectrum estimation part A 47*a* or outputs an execution signal 2 Se2 to the noise amplitude spectrum estimation part B 47*b*.

The noise amplitude spectrum estimation part A 47*a* or the noise amplitude spectrum estimation part B 47*b* estimates, based on the execution signal 1 Se1 or the execution signal 2 Se2 outputted by the determination part 42, a noise amplitude spectrum Seno from the amplitude spectrum Sa calculated by the amplitude spectrum calculation part 41.

(Estimation of Noise Amplitude Spectrum by Noise Amplitude Spectrum Estimation Part A)

The noise amplitude spectrum estimation part A 47*a* carries out estimation of the noise amplitude spectrum Seno when having received the execution signal 1 Se1 from the determination part 42.

When having received the execution signal 1 Se1 from the determination part 42, the noise amplitude spectrum estimation part A 47*a* obtains the amplitude spectrum Sa of the currently processed frame (hereinafter, simply referred to as the "current frame") from the amplitude spectrum calculation part 41 and a past amplitude spectrum Spa stored in the amplitude spectrum storage part 45. Next, the noise amplitude spectrum estimation part A 47*a* estimates the noise amplitude spectrum Seno using the difference between the amplitude spectrum Sa of the current frame and the past amplitude spectrum Spa.

For example, the noise amplitude spectrum estimation part A 47*a* estimates the noise amplitude spectrum Seno using the difference between the amplitude spectrum Sa of the current frame and the amplitude spectrum (Spa) of the frame occurring immediately before the last frame at which noise is generated. Alternatively, for example, the noise amplitude spectrum estimation part A 47*a* may estimate the noise amplitude spectrum Seno using the difference between the amplitude spectrum of the current frame and the average of the amplitude spectra of plural frames immediately before the last frame at which noise is generated.

As will be described later using FIG. 6 (flowchart), the noise amplitude spectrum estimation part A 47*a* estimates the noise amplitude spectrum Seno in a case where noise is detected in the current frame or the current frame is included within n frames counted after noise has been detected most recently. In the case where noise is detected in the current frame, the above-mentioned "last frame at which noise is generated" corresponds to the current frame. In the case where the current frame is included within n frames counted after noise has been detected most recently, the above-mentioned "last frame at which noise is generated" corresponds to the frame at which the noise has been detected most recently.

In order to reduce the storage areas, the amplitude spectrum storage part 45 preferably stores only the amplitude spectrum (or spectra) Sa to be used for the estimation carried out by the noise amplitude spectrum estimation part A 47*a*.

The storage control part A 43 controls the amplitude spectrum (or spectra) to be stored by the amplitude spectrum storage part 45. For example, in the storage control part A 43, a buffer for storing one or plural frames of amplitude spectrum (or spectra) is provided. Then, it is possible to reduce the storage areas to be used by the amplitude spectrum storage part 45, as a result of the storage control part A 43 carrying out control such that the amplitude spectrum (or spectra) stored by the buffer is(are) stored in the amplitude spectrum storage part 45 in an overwriting manner in a case where noise is detected from the current frame.

(Estimation of Noise Amplitude Spectrum by Noise Amplitude Spectrum Estimation Part B)

When having received the execution signal 2 Se2 from the determination part 42, the noise amplitude spectrum estimation part B 47*b* estimates the noise amplitude spectrum Seno based on an attenuation function obtained from the noise amplitude spectra estimated after noise is detected.

As will be described later using FIG. 6 (flowchart), the noise amplitude spectrum estimation part B 47*b* estimates the noise amplitude spectrum Seno in a case where no noise is detected in the current frame and the current frame is not included within n frames counted after noise has been detected most recently.

The noise amplitude spectrum estimation part B 47*b* assumes that the amplitude of noise attenuates exponentially, and obtains a function approximating the amplitudes of noise estimated at plural frames occurring immediately after the noise is detected by the noise detection part A 102 or the noise detection part B 103.

Figure 5:
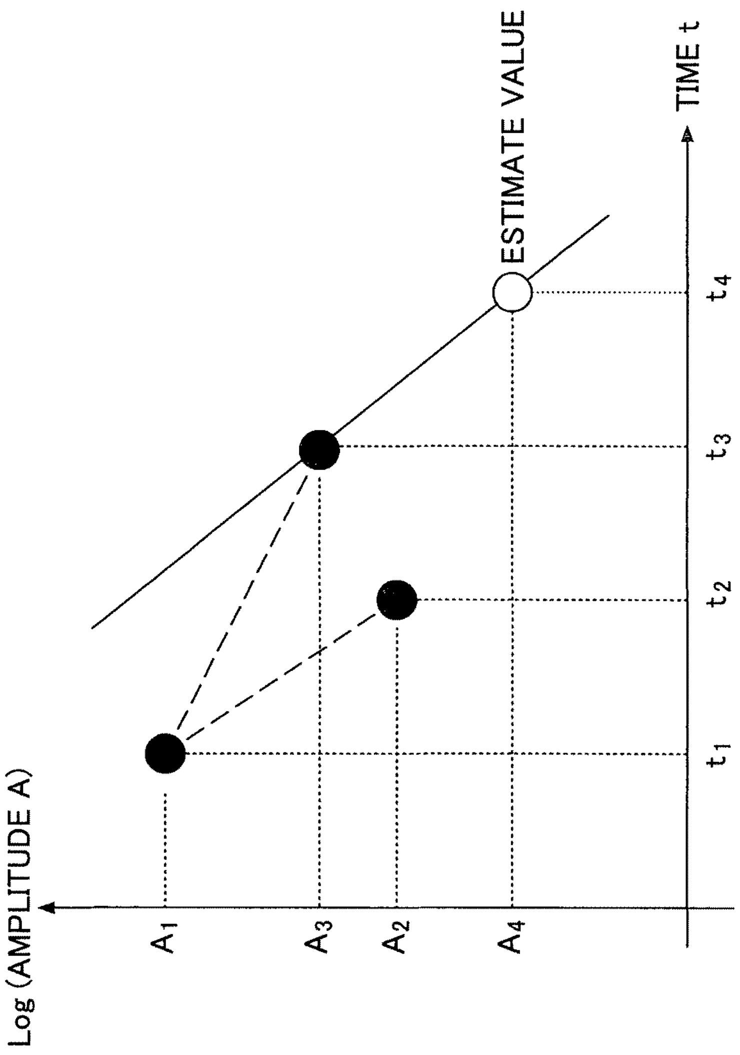
FIG. 5 illustrates a noise amplitude spectrum estimation method in the processing apparatus according to the first embodiment.

FIG. 5 shows an example in which the values of the amplitudes A1, A2 and A3 of three frames occurring after noise is detected are plotted in a graph in which the abscissa denotes time "t" and the ordinate denotes the logarithm of the amplitude A of noise.

The noise amplitude spectrum estimation part B 47*b* first obtains the slope of an approximate linear function for the amplitudes A1, A2 and A3 of the plural frames occurring on and after the generation of the noise using the following formula (5):

$$a=\frac{1}{2}\left(\frac{\log(A_2)-\log(A_1)}{t_2-t_1}+\frac{\log(A_3)-\log(A_1)}{t_3-t_1}\right) \quad (5)$$

The amplitude A of the noise attenuates according to the slope "a" obtained from the above-mentioned formula (5), frame by frame. Thus, the amplitude $A_m$ of the noise of the m-th frame after the detection of the noise can be obtained from the following formula (6):

$$A_m=\exp(\log(A_{m-1})-a) \quad (6)$$

Thus, the noise amplitude spectrum estimation part B 47*b* can estimate the noise amplitude spectrum Seno based on the attenuation function obtained from the noise amplitude spectra of the plural frames occurring after the detection of the noise.

It is noted that the attenuation function shown in the formula (6) is preferably obtained from the amplitudes of the plural frames that are the last frame from which the noise detection part A 102 or the noise detection part B 103 detects the noise and the subsequent frames. The number of the plural frames to be used to obtain the attenuation function can be appropriately determined. Further, although the attenuation function is assumed to be the exponential function in the embodiment, the attenuation function is not limited thereto. Alternatively, the attenuation function may be obtained as another function such as a linear function.

Further, as the amplitude of the noise of the frame occurring before the current frame to be used for the estimation with the formula (6), it is preferable to use the amplitude of the noise of the frame occurring after the detection of the noise and immediately before the current frame.

When having received the execution signal 2 Se2 from the determination part 42, the noise amplitude spectrum estimation part B 47*b* obtains from the noise amplitude storage part 46 the noise amplitude spectra Spn (see FIG. 4) estimated in the past time necessary to obtain the noise amplitude spectrum of the current frame by the above-mentioned method.

The noise amplitude spectrum storage part 46 stores the noise amplitude spectra Seno estimated by the noise amplitude spectrum estimation part A 47*a* or the noise amplitude spectrum estimation part B 47*b*. In order to reduce the storage areas, it is preferable to store in the noise amplitude spectrum storage part 46 only the noise amplitude spectra to be used for the estimation of the noise amplitude spectrum Seno by the noise amplitude spectrum estimation part B 47*b*. The noise amplitude spectra Spn to be used for the estimation of the noise amplitude spectrum Seno by the noise amplitude spectrum estimation part B 47*b* are, as mentioned above, the noise amplitude spectra of the plural frames occurring after the detection of the noise (for obtaining the attenuation function) and the noise amplitude spectrum of the frame occurring immediately before the current frame (for obtaining the noise amplitude spectrum of the current frame using the attenuation function).

The storage control part B 44 carries out control such that only the noise amplitude spectra necessary for obtaining the attenuation function and the noise amplitude spectrum necessary for obtaining the noise amplitude spectrum of the current frame using the attenuation function are stored in the noise amplitude spectrum storage part 46.

For example, storage areas are provided in the noise amplitude spectrum storage part 46 for storing the plural (for example, three) frames occurring after the noise is detected and the noise amplitude spectrum of the frame occurring immediately before the current frame. The storage control part B 44 carries out control such that according to the period of time that has elapsed after the noise is detected, the noise amplitude spectra Seno estimated by the noise amplitude spectrum estimation part A 47*a* are stored in the respective storage areas of the noise amplitude spectrum storage part 46 in an overwriting manner. By such control, it is possible to reduce the storage areas to be used by the noise amplitude spectrum storage part 46.

As described above, in the noise amplitude spectrum estimation part 104, any one of the noise amplitude spectrum estimation part A 47*a* and the noise amplitude spectrum estimation part B 47*b* estimates the noise amplitude spectrum Seno based on the execution signal 1 or 2 (Se1 or Se2) outputted by the determination part 42.

(Process of Estimating Noise Amplitude Spectrum by Noise Amplitude Spectrum Estimation Part)

Figure 6:
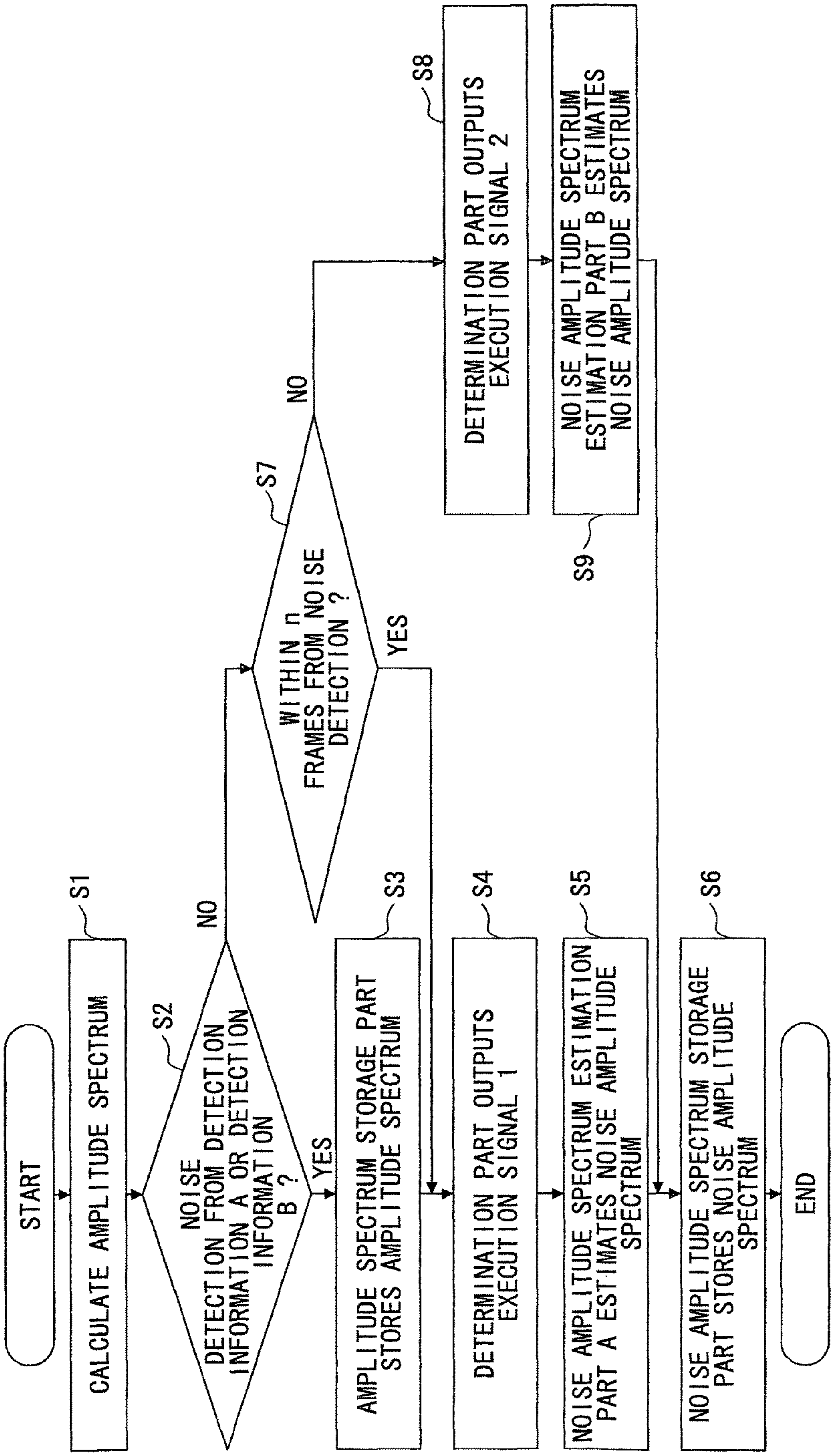
FIG. 6 illustrates a flowchart of a process of estimating a noise amplitude spectrum in the processing apparatus according to the first embodiment.

FIG. 6 illustrates a flowchart of the process of estimating the noise amplitude spectrum Seno by the noise amplitude spectrum estimation part 104 according to the first embodiment.

When the frequency spectrum Sif has been inputted to the noise amplitude spectrum estimation part 104 from the frequency spectrum conversion part 101, the amplitude spectrum calculation part 41 calculates the amplitude spectrum Sa from the frequency spectrum Sif in step S1. Next, in step S2, the determination part 42 determines from the detection information A IdA and the detection information B IdB whether any one of the noise detection part A 102 and the noise detection part B 103 has detected noise from the inputted sound.

When noise is included in the frame of the inputted sound signal Sis (step S2 YES), the storage control part A 43 stores the amplitude spectrum (or spectra), temporarily stored in the buffer, in the amplitude spectrum storage part 45 in step S3.

Next, in step S4, the determination part 42 outputs the execution signal 1 Se1, and the noise amplitude spectrum estimation part A 47*a* estimates the amplitude spectrum Seno in step S5. Next, in step S6, the storage control part B 44 stores the noise amplitude spectrum Seno estimated by the noise amplitude spectrum estimation part A 47*a* in the noise amplitude spectrum storage part 46 at the storage area corresponding to, the time that has elapsed from the last detection of the noise in an overwriting manner, and the process is finished.

In a case where no noise is included in the frame of the inputted sound signal (step S2 NO), the determination part 42 determines whether the currently processed frame is included within n frames counted after the last detection of noise, in step S7. In a case where the currently processed frame is included within n frames counted after the last detection of noise (step S7 YES), the noise amplitude spectrum estimation part A 47*a* estimates the noise amplitude spectrum Seno in steps S4 to S6, and the process is finished.

In a case where the currently processed frame is not included within n frames counted after the last detection of noise (step S7 NO), the determination part 42 outputs the execution signal Se2 in step S8. Next, in step S9, the noise amplitude spectrum estimation part B 47*b* estimates the noise amplitude spectrum Seno. After that, in step S6, the storage control part B 44 stores the noise amplitude spectrum Seno estimated by the noise amplitude spectrum estimation part B 47*b* in the noise amplitude spectrum storage part 46, and the process is finished.

Thus, the noise amplitude spectrum estimation part 104 estimates the noise amplitude spectrum Seno of the noise included in the inputted sound by any one of the noise amplitude spectrum estimation part A 47*a* and the noise amplitude spectrum estimation part B 47*b*, and the two noise amplitude spectrum estimation parts 47*a* and 47*b* estimate the noise amplitude spectrum Seno in the different methods. By thus providing the two noise amplitude spectrum estimation parts 47*a* and 47*b* estimating the noise amplitude spectrum Seno in the different methods, it is possible to estimate the noise amplitude spectrum Seno of the noise included in the inputted sound, regardless of the type and/or generation timing of the noise.

Figure 7:
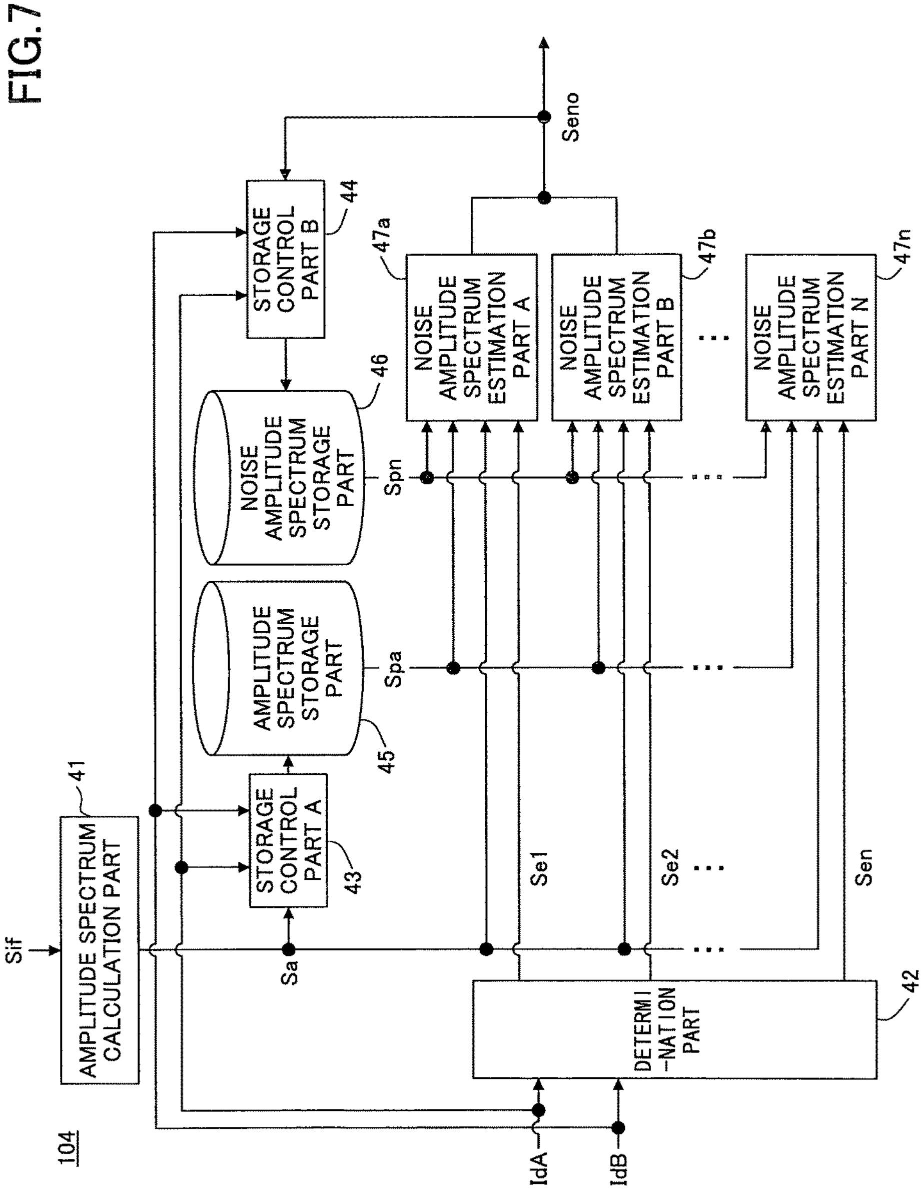
FIG. 7 is a block diagram showing another example of the functional configuration of the noise amplitude spectrum estimation part in the processing apparatus according to the first embodiment.

It is noted that as shown in FIG. 7, in the noise amplitude spectrum estimation part 104, plural noise amplitude spectrum estimation parts A to N (47*a* to 47*n*) may be provided which estimate the noise amplitude spectrum Seno in different methods, and the determination part 42 may appropriately select one of the plural noise amplitude spectrum estimation parts A to N (47*a* to 47*n*) to estimate the noise amplitude spectrum Seno based on the detection information A IdA and the detection information B IdB.

In the case of FIG. 7, as one of the different methods of estimating the noise amplitude spectrum Seno of the noise amplitude spectrum estimation parts A to N, other than those of the noise amplitude spectrum estimation parts A and B (47*a* and 47*b*) shown in FIG. 4, a method of estimating the noise amplitude spectrum Seno using the difference between the amplitude spectrum of the current frame and the amplitude spectrum of the average of plural amplitude spectra obtained before the most recent detection of noise may be used, for example. Alternatively or additionally, it is also possible to use a method of obtaining the noise amplitude spectrum Seno using the attenuation function to be a linear function or the like (instead of the above-mentioned exponential function) obtained from noise amplitude spectra estimated on and after the most recent generation of noise, for example.

In the case of FIG. 7, the determination part 42 is set to select the appropriate method of estimating the noise amplitude spectrum Seno according to the magnitude(s) of a power fluctuation and/or a linear predictive error obtained by the noise detection part A 102 and included in the detection information B IdA or the likelihood obtained by the noise detection part B 103 and included in the detection information B IdB, and output execution signals 1 to N (Se1 to Sen).

<<Subtraction of Noise Spectrum>>

The noise spectrum subtraction part 105 of the processing apparatus 100 subtracts a frequency spectrum of noise obtained from the noise amplitude spectrum Seno estimated by the noise amplitude spectrum estimation part 104 from the frequency spectrum Sif obtained from the conversion by the frequency spectrum conversion part 101, and outputs a thus noise reduced frequency spectrum Sof.

A frequency spectrum Sˆ of a sound (the noise reduced frequency spectrum Sof) can be obtained from the following formula (7) where X denotes a frequency spectrum (the frequency spectrum Sif), and Dˆ denotes an estimated frequency spectrum of noise (obtained from the noise amplitude spectrum Seno):

$$\begin{aligned}\hat{S}(l,k) &= \left(|X(l,k)| - |\hat{D}(l,k)|\right)e^{j\angle X(l,k)} \\ &= \left(1 - \frac{|\hat{D}(l,k)|}{|X(l,k)|}\right)X(l,k)\end{aligned} \quad (7)$$

In the above formula (7), "l" denotes the frame number and "k" denotes the spectrum number.

Thus, the noise spectrum subtraction part 105 subtracts the noise frequency spectrum Seno from the frequency spectrum Sif, obtains the noise reduced frequency spectrum Sof, and outputs the noise reduced frequency spectrum Sof to the frequency spectrum inverse conversion part 106.

As described above, in the processing apparatus 100 according to the first embodiment, the plural parts are provided to estimate the noise amplitude spectrum Seno (noise amplitude spectrum estimation parts) in the different methods, the suitable noise amplitude spectrum estimation part is selected therefrom based on the noise detection result of the inputted sound, and the noise amplitude spectrum Seno is estimated. Thus, regardless of the type and/or generation timing of noise, the processing apparatus 100 can estimate the noise amplitude spectrum Seno of noise included in the inputted sound with high accuracy, and output the sound signal obtained from reducing the noise from the inputted sound.

It is noted that the processing apparatus 100 according to the first embodiment may be applied to an electronic apparatus or the like which records an input sound or transmits an input sound to another apparatus. Specific examples of the electronic apparatus or the like include a video camera, a digital camera, an IC recorder, a cellular phone, a conference terminal (a terminal for a video conference) and so forth.

Second Embodiment

Next, a second embodiment will be described using figures. It is noted that for the same elements/components as those of the first embodiment described above, the same reference numerals/letters are given, and duplicate description will be omitted.

<Functional Configuration of Processing System>

Figure 8:
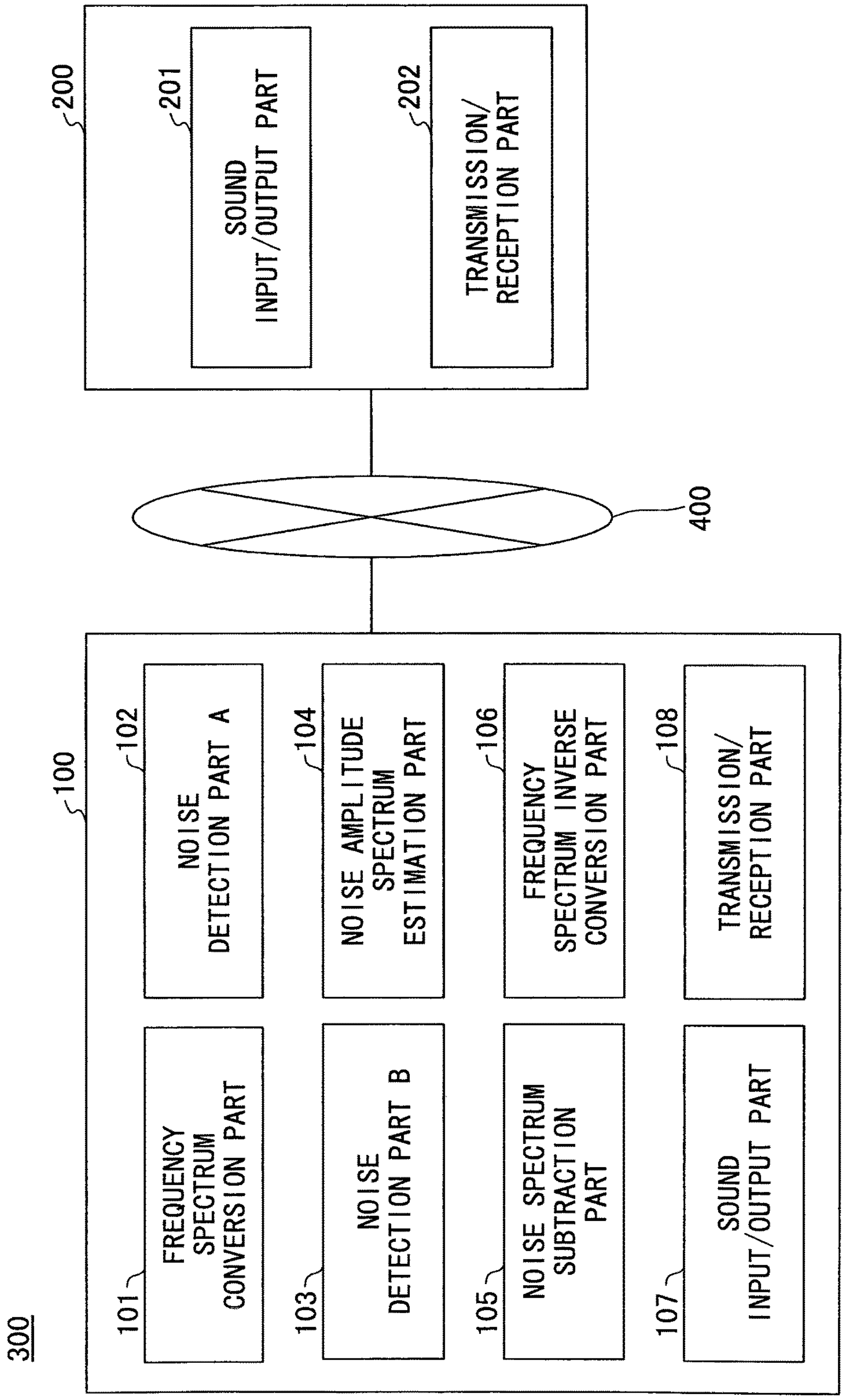
FIG. 8 is a block diagram illustrating a functional configuration of a processing system according to a second embodiment.

FIG. 8 is a block diagram illustrating a functional configuration of a processing system 300 according to the second embodiment. As shown in FIG. 8, the processing system 300 includes processing apparatuses 100 and 200 connected via a network 400.

The processing apparatus 100 includes a frequency spectrum conversion part 101, a noise detection part A 102, a noise detection part B 103, a noise amplitude spectrum estimation part 104, a noise spectrum subtraction part 105, a frequency spectrum inverse conversion part 106, a sound input/output part 107 and a transmission/reception part 108.

The sound input/output part 107, for example, collects a sound (voice and/or the like) occurring around the processing apparatus 100 and generates a sound signal, or outputs a sound (voice and/or the like) based on an inputted sound signal.

The transmission/reception part 108 transmits data such as a sound signal from which noise is reduced by the processing apparatus 100 to another apparatus connected via the network 400. Further, the transmission/reception part 108 receives data such as sound data from another apparatus connected via the network 400.

As described above for the first embodiment, in the processing apparatus 100 according to the second embodiment, the plural parts are provided to estimate the noise amplitude spectrum Seno (noise amplitude spectrum estimation parts) in the different methods, the suitable noise amplitude spectrum estimation part is selected therefrom based on the noise detection result of the inputted sound, and the noise amplitude spectrum Seno is estimated. Thus, regardless of the type and/or generation timing of noise, the processing apparatus 100 can estimate the noise amplitude spectrum Seno of noise included in the inputted sound with high accuracy, and output the sound signal obtained from reducing the noise from the inputted sound.

Further, the apparatus 200 connected to the processing apparatus 100 via the network 400 includes a sound input/output part 201 and a transmission/reception part 202.

The sound input/output part 201, for example, collects a sound (voice and/or the like) occurring around the processing apparatus 200 and generates a sound signal, or outputs a sound (voice and/or the like) based on an inputted sound signal.

The transmission/reception part 202 transmits data such as a sound signal obtained by the sound input/output part 201 to another apparatus connected via the network 400. Further, the transmission/reception part 202 receives data such as a sound data from another apparatus connected via the network 400.

<Hardware Configuration of Processing System>

Figure 9:
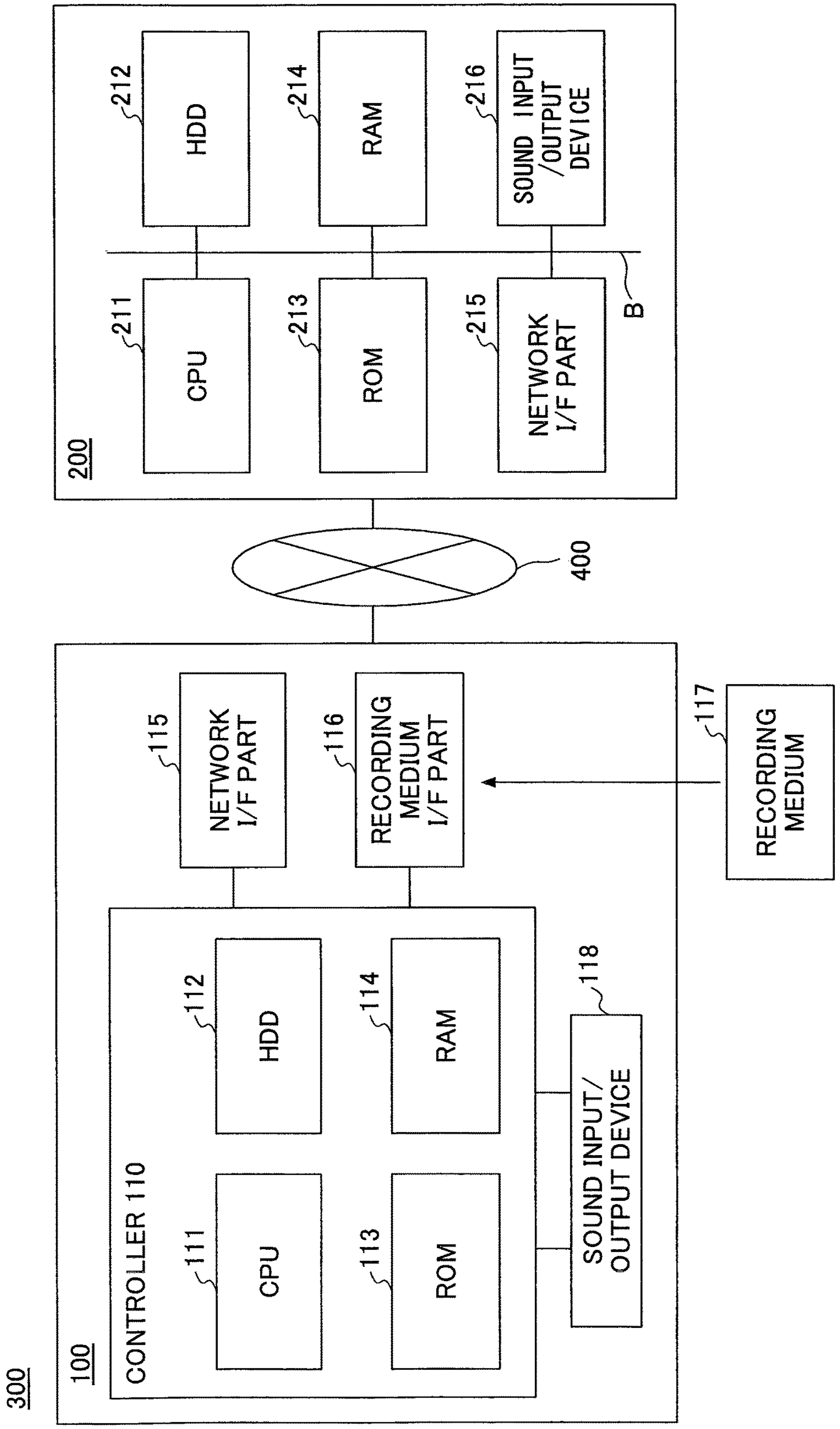
FIG. 9 illustrates a hardware configuration of the processing system according to the second embodiment.

FIG. 9 illustrates a hardware configuration of the processing system 300 according to the second embodiment.

The processing system 300 includes a controller 110, a network I/F part 115, a recording medium I/F part 116 and a sound input/output device 118. The controller 110 includes a CPU 111, a HDD 112, a ROM 113 and a RAM 114.

The sound input/output device 118 includes, for example, a microphone collecting a sound (voice and/or the like) occurring around the processing apparatus 100 and generating a sound signal, a speaker outputting a sound signal to the outside, and/or the like.

The processing part 200 includes a CPU 211, a HDD 212, a ROM 213, a RAM 214, a network I/F part 215 and a sound input/output device 216.

The CPU 211 includes an arithmetic and logic unit, reads a program and data from a storage device such as the HDD 212 or ROM 213 into the RAM 214, executes processes, and thus, realizes the respective functions of the processing apparatus 200.

The HDD 212 is a non-volatile storage device storing programs and data. The stored programs and data include an OS (Operating System) that is basic software controlling the entirety of the processing apparatus 200, application software providing various functions on the OS, and so forth.

The ROM 213 is a non-volatile semiconductor memory (storage device) that has a capability of storing a program(s) and/or data even after power supply is turned off. The ROM 213 stores programs and data such as a BIOS (Basic Input/Output System) to be executed when the processing apparatus 200 is started up, OS settings, network settings and so forth. The RAM 214 is a volatile semiconductor memory (storage device) for temporarily storing a program(s) and/or data.

The network I/F part 215 is an interface between a peripheral device(s) having a communication function, connected via the network 400 built by a data transmission path such as a wired and/or wireless circuit, such as a LAN (Local Area Network), a WAN (Wide Area Network) or the like, and the processing apparatus 200 itself.

The sound input/output device 216 includes, for example, a microphone collecting a sound (voice and/or the like) occurring around the processing apparatus 200 and generating a sound signal, a speaker outputting a sound signal to the outside, and/or the like.

In the processing system 300, for example, the processing apparatus 100 can generate a sound signal from which noise is reduced, from an inputted signal including a sound (voice and/or the like) uttered by the user of the processing apparatus 100, and transmit the generated sound signal to the processing apparatus 200 via the transmission/reception part 108. The processing apparatus 200 receives the sound signal from which noise is thus reduced transmitted from the processing apparatus 100, via the transmission/reception part 202, and outputs the sound signal to the outside via the sound input/output part 201. The user of the processing apparatus 200 thus receives the sound signal from which noise is reduced from the processing apparatus 100, and thus, can clearly catch the sound uttered by the user of the processing apparatus 100.

Further, for example, the processing apparatus 200 can obtain a sound signal including a sound (voice) uttered by the user of the processing apparatus 200 via the sound input/output part 201 of the processing apparatus 200, and transmit the sound signal to the processing apparatus 100 via the transmission/reception part 202. In this case, the processing apparatus 100 can reduce noise from the sound signal received via the transmission/reception part 108 by carrying out estimation of the noise amplitude spectrum and so forth, and output the sound signal via the sound input/output part 107. Thus, the user of the processing apparatus 100 can clearly catch the sound uttered by the user of the processing apparatus 200 as a result of the processing apparatus 100 outputting the received sound signal after reducing noise.

Thus, in the processing system 300 according to the second embodiment, it is possible to generate a sound signal obtained from reducing noise from a sound signal inputted to the sound input/output part 107 or a sound signal received via the transmission/reception part 108 of the processing apparatus 100, based on the estimated noise amplitude spectrum. Thus, it is possible to carry out conversation, recording and/or the like by a clear sound obtained from noise being reduced, between the users of the processing apparatus 100 and the processing apparatus 200 connected via the network 400.

It is noted that the number of the processing apparatuses included in the processing system 300, for example, is not limited to that of the second embodiment. The processing system 300 may include three or more processing apparatuses. Further, the processing system 300 according to the second embodiment may be applied to a system in which, for example, plural PCs, PDAs, cellular phones, conference terminals and/or the like transmit/receive a sound or the like thereamong.

Third Embodiment

Next, a third embodiment will be described using figures. It is noted that for the same elements/components as those of the first and second embodiments described above, the same reference numerals/letters are given, and duplicate description will be omitted.

<Functional Configuration of Processing Apparatus>

Figure 10:
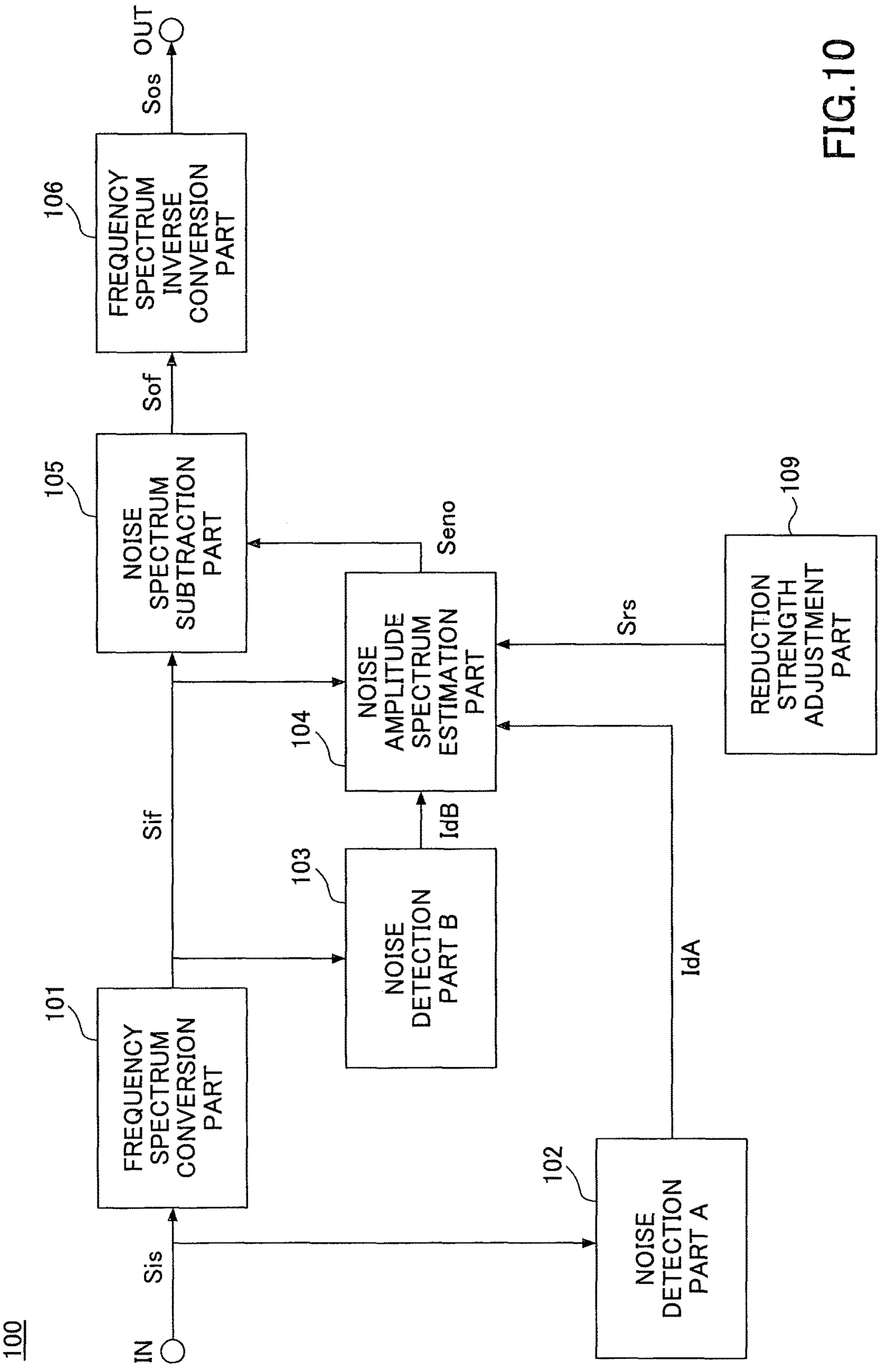
FIG. 10 is a block diagram illustrating a functional configuration of a processing apparatus according to a third embodiment.

FIG. 10 is a block diagram illustrating a functional configuration of a processing apparatus 100 according to the third embodiment;

As shown in FIG. 10, the processing apparatus 100 includes an input terminal IN, a frequency spectrum conversion part 101, a noise detection part A 102, a noise detection part B 103, a noise amplitude spectrum estimation part 104, a noise spectrum subtraction part 105, a frequency spectrum inverse conversion part 106, a reduction strength adjustment part 109 and an output terminal OUT.

The reduction strength adjustment part 109 adjusts a level of reducing noise from an inputted sound signal inputted to the processing apparatus 100 by outputting a reduction strength adjustment signal Srs to the noise amplitude spectrum estimation part 104 based on inputted information from the user.

<Hardware Configuration of Processing Apparatus>

Figure 11:
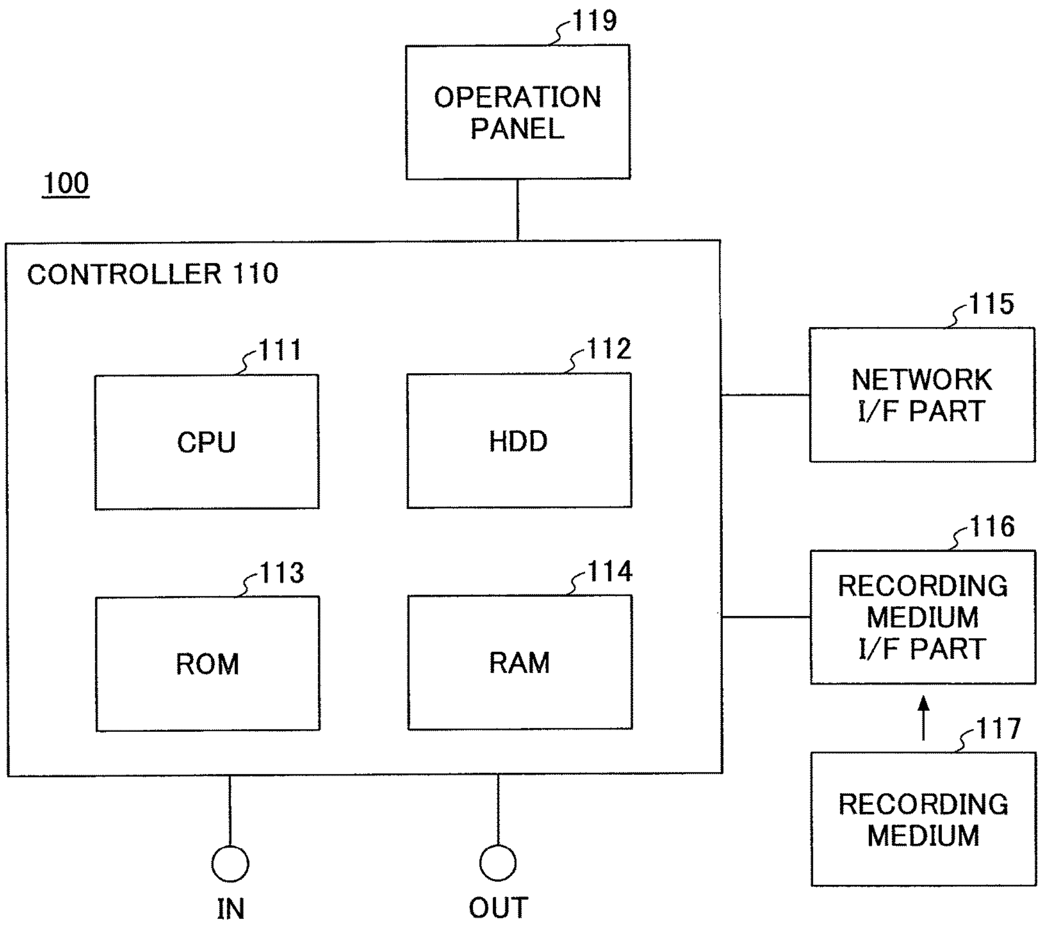
FIG. 11 illustrates a hardware configuration of the processing apparatus according to the third embodiment.

FIG. 11 illustrates a hardware configuration of the processing apparatus 100.

As shown in FIG. 11, the processing apparatus 100 includes a controller 110, a network I/F 115, a recording medium I/F part 116, an operation panel 119, an input terminal IN, and an output terminal OUT. The controller 110 includes a CPU 111, a HDD (Hard Disk Drive) 112, a ROM (Read Only Memory) 113 and a RAM (Random Access Memory) 114.

The operation panel 119 is hardware including an input device such as buttons for receiving user's operations, an operation screen such as a liquid crystal panel having a touch panel function, and/or the like. On the operation panel 119, levels of reducing noise from an inputted sound signal, inputted to the processing apparatus 100, or the like, are displayed in such a manner that the user can select one of the displayed levels. The reduction strength adjustment part 109 outputs the reduction strength adjustment signal Srs based on the information inputted by the user to the operation panel 119.

<Functional Configuration of Noise Amplitude Spectrum Estimation Part>

Figure 12:
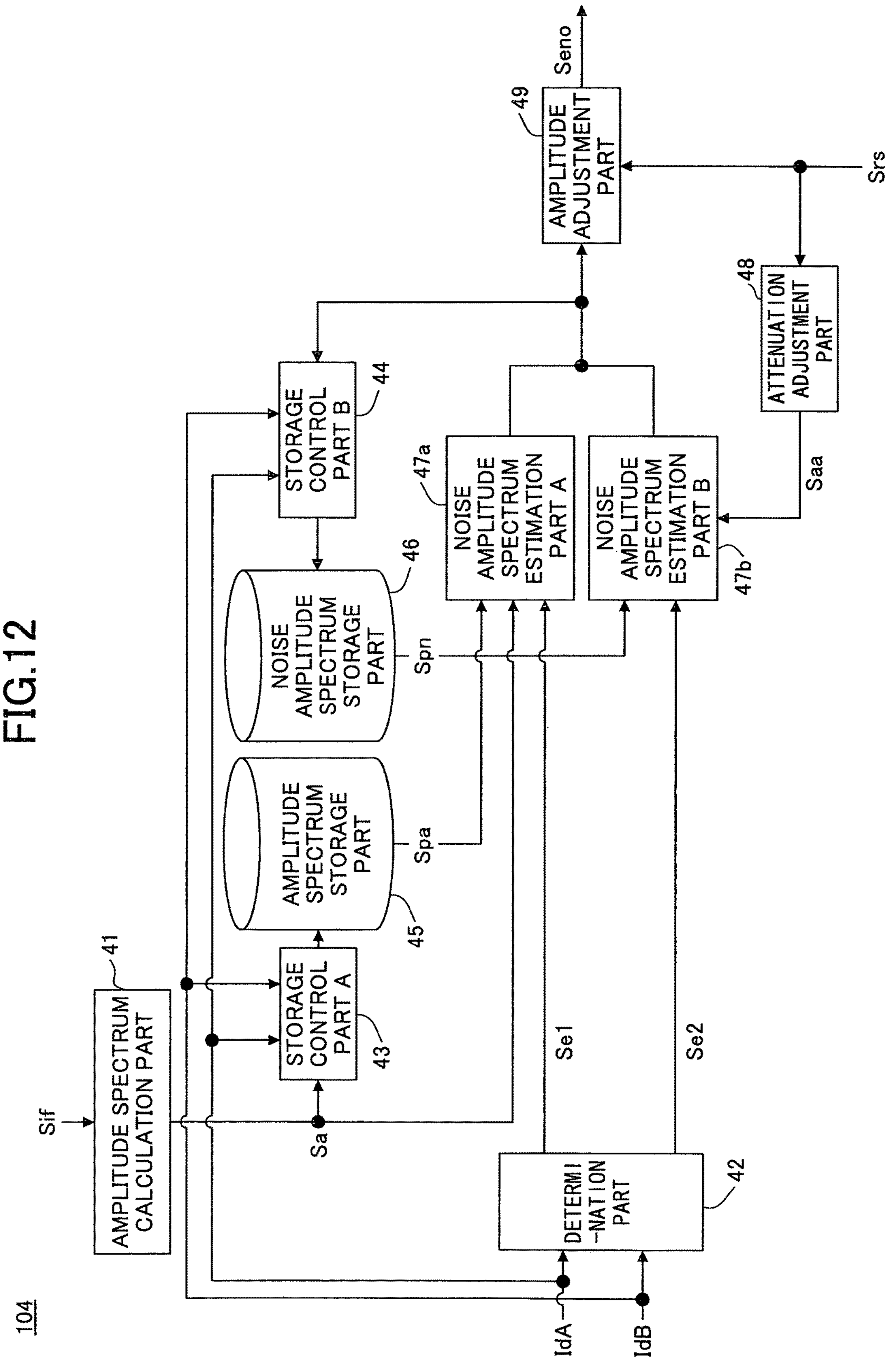
FIG. 12 is a block diagram illustrating a functional configuration of a noise amplitude spectrum estimation part of the processing apparatus according to the third embodiment.

FIG. 12 illustrates a functional configuration of the noise amplitude spectrum estimation part 104 according to the third embodiment.

As shown in FIG. 12, the noise amplitude spectrum estimation part 104 includes an amplitude spectrum calculation part 41, a determination part 42, a storage control part A 43, a storage control part B 44, an amplitude spectrum storage part 45, a noise amplitude spectrum storage part 46, a noise amplitude spectrum estimation part A 47*a*, a noise amplitude spectrum estimation part B 47*b*, an attenuation adjustment part 48 and an amplitude adjustment part 49.

The attenuation adjustment part 48 is one example of a noise adjustment part, and outputs an attenuation adjustment signal Saa to the noise amplitude spectrum estimation part B 47*b* based on the reduction strength adjustment signal Srs outputted by the reduction strength adjustment part 109.

The same as in the first embodiment, the noise amplitude spectrum estimation part B 47*b* obtains the slope "a" of the approximate linear function for plural frames occurring on and after generation of noise by the above-mentioned formula (5). Next, the noise amplitude spectrum estimation part B 47*b* obtains the amplitude $A_m$ of the noise of the m-th frame counted after the detection of the noise by the following formula (8):

$$A_m=\exp(\log(A_{m-1})-g\cdot a) \tag{8}$$

The coefficient "g" in the formula (8) is a value determined according to the reduction strength adjustment signal Srs inputted from the reduction strength adjustment part 109 to the attenuation adjustment part 48.

In a case of reducing noise from an inputted sound signal, noise reduction strengths 1 to 3 in which a level of reducing noise is different, for example, are displayed on the operation panel 119, the user is to select one therefrom, and the reduction strength adjustment part 109 outputs the thus selected noise reduction strength to the attenuation adjustment part 48 as the reduction strength adjustment signal Srs. The attenuation adjustment part 48 determines an attenuation adjustment signal Saa according to a table 1 shown below, for example, according to the reduction strength adjustment signal Srs outputted by the reduction strength adjustment part 109, and transmits the determined attenuation adjustment signal Saa to the noise amplitude spectrum estimation part B 47*b*.

TABLE 1

| reduction strength adjustment signal Srs | attenuation adjustment signal Saa |
|---|---|
| noise reduction strength = 1 | g = 2.0 |
| noise reduction strength = 2 | g = 1.5 |
| noise reduction strength = 3 | g = 1.0 |

In the example shown in Table 1, the coefficient "g" becomes smaller as the noise reduction strength becomes larger, and the noise amplitude spectrum estimated by the noise amplitude spectrum estimation part B 47*b* becomes larger according to the formula (8). Thus, the noise is much reduced from the inputted sound signal. In contrast thereto, the coefficient "g" becomes larger as the noise reduction strength becomes smaller, and the noise amplitude spectrum estimated by the noise amplitude spectrum estimation part B 47*b* becomes smaller according to the formula (8). Thus, the noise reduced from the inputted sound signal becomes smaller.

Further, the amplitude adjustment part 49 is one example of a noise adjustment part, and adjusts the magnitude of the noise amplitude spectrum $A_m$ obtained by the noise amplitude spectrum estimation part A 47*a* or the noise amplitude spectrum estimation part B 47*b*, based on the reduction strength adjustment signal Srs outputted by the reduction strength adjustment part 109, according to the following formula (9):

$$A_m'=G\cdot A_m \tag{9}$$

The coefficient "G" in the formula (9) is a value, for example, determined according to Table 2 below according to the reduction strength adjustment signal Srs outputted by the reduction strength adjustment part 109:

TABLE 2

| reduction strength adjustment signal Srs | G |
|---|---|
| noise reduction strength = 1 | 0.50 |
| noise reduction strength = 2 | 0.75 |
| noise reduction strength = 3 | 1.00 |

The amplitude adjustment part 49 thus determines the value of "G" according to the reduction strength adjustment signal Srs, and outputs the estimated noise amplitude spectrum $A_m'$ (Seno) obtained according to the formula (9). In the example shown in Table 2, in a case where the noise reduction strength is smaller, the estimated noise amplitude spectrum $A_m'$ (Seno) to be outputted is smaller since the value of "G" is smaller. In contrast thereto, in a case where the noise reduction strength is larger, the estimated noise amplitude spectrum $A_m'$ (Seno) to be outputted is larger since the value of "G" is larger. It is noted that as the value of "G", a different value may be given for each frequency of the calculated amplitude spectrum Sa.

Thus, in the processing apparatus 100 according to the third embodiment, the noise amplitude spectrum estimation part 104 can control the strength of the estimated noise amplitude spectrum $A_m$ (Seno) according to the reduction strength adjustment signal Srs outputted by the reduction strength adjustment part 109, and thus, adjust the level of reducing the noise from the inputted sound signal.

(Process of Estimating Noise Amplitude Spectrum by Noise Amplitude Spectrum Estimation Part)

Figure 13:
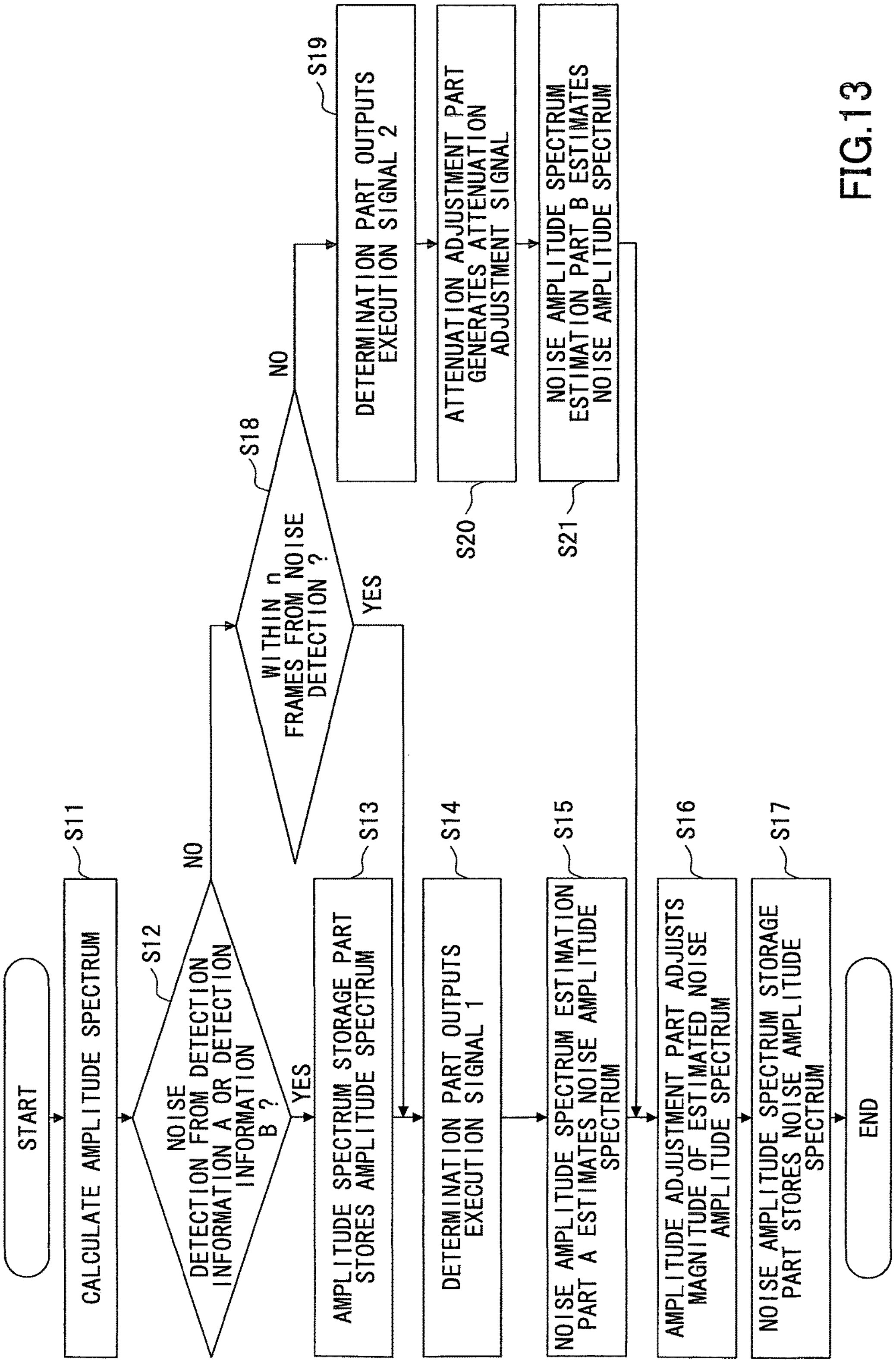
FIG. 13 illustrates a flowchart of a process of estimating a noise amplitude spectrum in the processing apparatus according to the third embodiment.

FIG. 13 illustrates a flowchart of the process of estimating the noise amplitude spectrum Seno by the noise amplitude spectrum estimation part 104 according to the third embodiment.

When the frequency spectrum Sif has been inputted to the noise amplitude spectrum estimation part 104 from the frequency spectrum conversion part 101, the amplitude spectrum calculation part 41 calculates the amplitude spectrum Sa from the frequency spectrum Sif in step S11. Next, in step S12, the determination part 42 determines from the detection information A IdA and the detection information B IdB whether any one of the noise detection part A 102 and the noise detection part B 103 has detected noise from the inputted sound.

When noise is included in a frame of the inputted sound signal Sis (step S12 YES), the storage control part A 43 stores the amplitude spectrum (or spectra), temporarily stored in the buffer, in the amplitude spectrum storage part 45 in step S13.

Next, in step S14, the determination part 42 outputs the execution signal 1 Se1, and the noise amplitude spectrum estimation part A 47*a* estimates the amplitude spectrum in step S15. After that, in step S16, the amplitude adjustment part 49 calculates the estimated noise amplitude spectrum Seno obtained by the formula (9) according to the reduction strength adjustment signal Srs outputted by the reduction strength adjustment part 109.

Next, in step S17, the storage control part B 44 stores the estimated noise amplitude spectrum Seno calculated by the amplitude adjustment part 49 in the noise amplitude spectrum storage part 46 at the storage area corresponding to the time that has elapsed from the last detection of the noise in an overwriting manner, and the process is finished.

In a case where no noise is included in the frame of the inputted sound signal (step S12 NO), the determination part 42 determines whether the currently processed frame is included within the n frames counted from the last detection of the noise in step S18. In a case where the currently processed frame is included within the n frames counted from the last detection of the noise (step S18 YES), the noise amplitude spectrum estimation part A 47*a* estimates the noise amplitude spectrum in steps S14 and S15.

In a case where the currently processed frame is not included within the n frames counted from the last detection of the noise (step S18 NO), the determination part 42 outputs the execution signal Se2 in step S19. Next, in step S20, the attenuation adjustment part 48 generates the attenuation adjustment signal Saa, and outputs the attenuation adjustment signal Saa to the noise amplitude spectrum estimation part B 47*b*. Next, in step S21, the noise amplitude spectrum estimation part B 47*b* estimates the noise amplitude spectrum.

After that, in step S16, the amplitude adjustment part 49 calculates the estimated noise amplitude spectrum Seno obtained by the formula (9) according to the reduction strength adjustment signal Srs outputted by the reduction strength adjustment part 109. In step S17, the storage control part B 44 stores the noise amplitude spectrum estimated by the noise amplitude spectrum estimation part B 47*b* in the noise amplitude spectrum storage part 46, and the process is finished.

Thus, the noise amplitude spectrum estimation part 104 estimates the noise amplitude spectrum of the noise included in the inputted sound by any one of the noise amplitude spectrum estimation part A 47*a* and the noise amplitude spectrum estimation part B 47*b*, the two noise amplitude spectrum estimation parts 47*a* and 47*b* estimating the noise amplitude spectrum in the different methods. By having the two noise amplitude spectrum estimation parts 47*a* and 47*b* estimating the noise amplitude spectrum in the different methods, the noise amplitude spectrum estimation part 14 can estimate the noise amplitude spectrum of the noise included in the inputted sound regardless of the type and/or generation timing of the noise.

Further, the processing apparatus 100 according to the third embodiment has the reduction strength adjustment part 109, can adjust the strength of the noise amplitude spectrum Seno to be estimated from the inputted sound, and can change the level of reducing the noise from the inputted sound signal. Thus, the user can appropriately change the noise reduction level according to a situation. That is, the user can carry out a setting to reduce the noise reduction level in a case of wishing to faithfully reproduce the original sound. Also, the user can carry out another setting to increase the noise reduction level in a case of wishing to reduce the noise from the original sound as much as possible.

Figure 14:
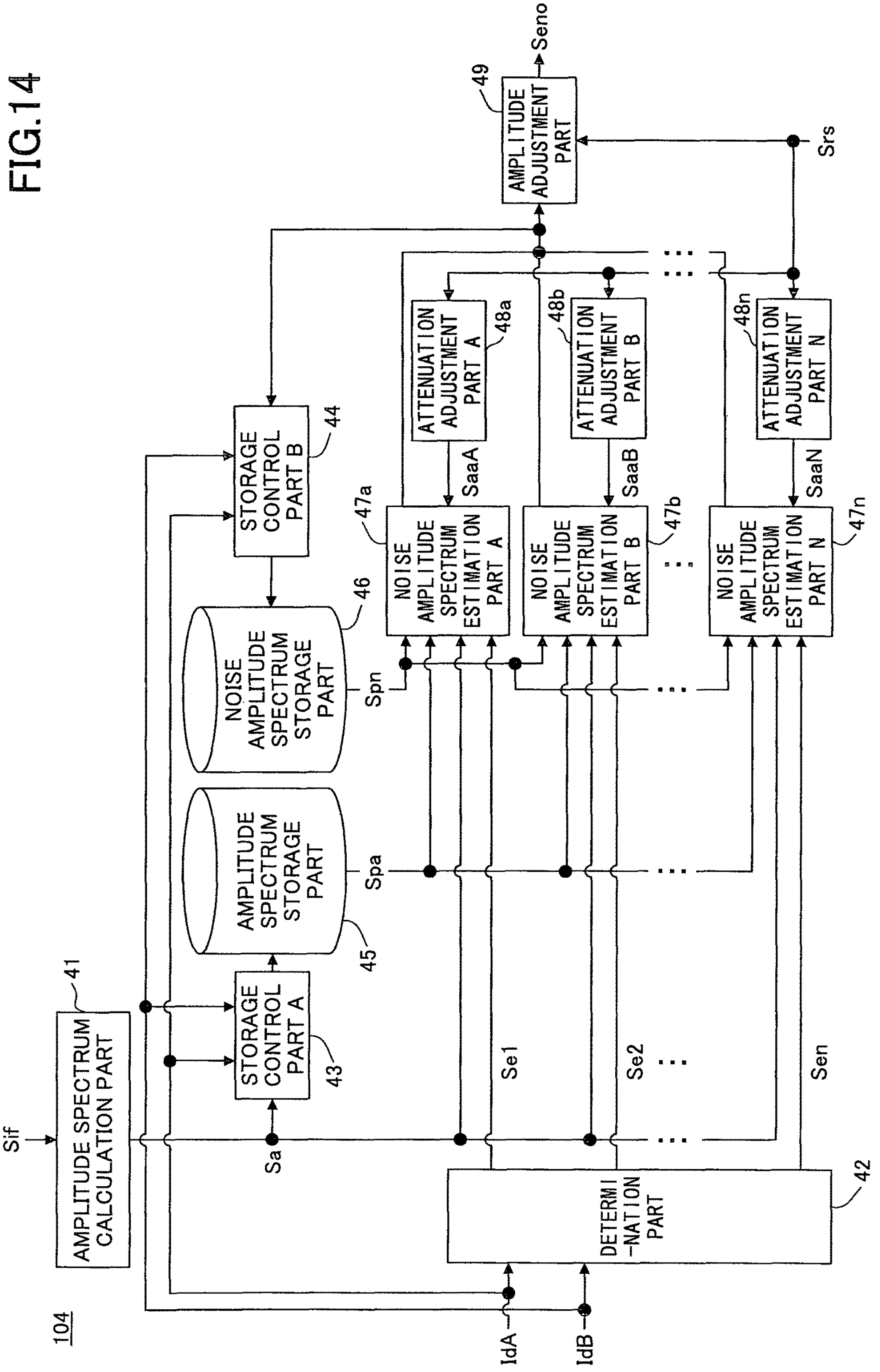
FIG. 14 is a block diagram showing another example of the functional configuration of the noise amplitude spectrum estimation part in the processing apparatus according to the third embodiment.

It is noted that as shown in FIG. 14, in the noise amplitude spectrum estimation part 104, plural noise amplitude spectrum estimation parts A to N (47*a* to 47*n*) may be provided, the plural noise amplitude spectrum estimation parts A to N (47*a* to 47*n*) estimate the noise amplitude spectrum in different methods, and also, plural attenuation adjustment parts A to N (48*a* to 48*n*) may be provided. In this case, one of the noise amplitude spectrum estimation parts A to N (47*a* to 47*n*) selected by the determination part 42 with the corresponding one of the execution signals Se1 to Sen estimates the noise amplitude spectrum according to the corresponding one of the attenuation adjustment signals A to N (SaaA to SaaN) outputted by the corresponding one of the attenuation adjustment parts A to N (48*a* to 48*n*). Further, in this case, the amplitude adjustment part 49 adjusts the noise amplitude spectrum estimated by the selected one of the noise amplitude spectrum estimation parts A to N (47*a* to 47*n*) according to the reduction strength adjustment signal Srs.

Fourth Embodiment

Next, a fourth embodiment will be described using figures. It is noted that for the same elements/components as those of the embodiments described above, the same reference numerals/letters are given, and duplicate description will be omitted.

<Functional Configuration of Processing System>

Figure 15:
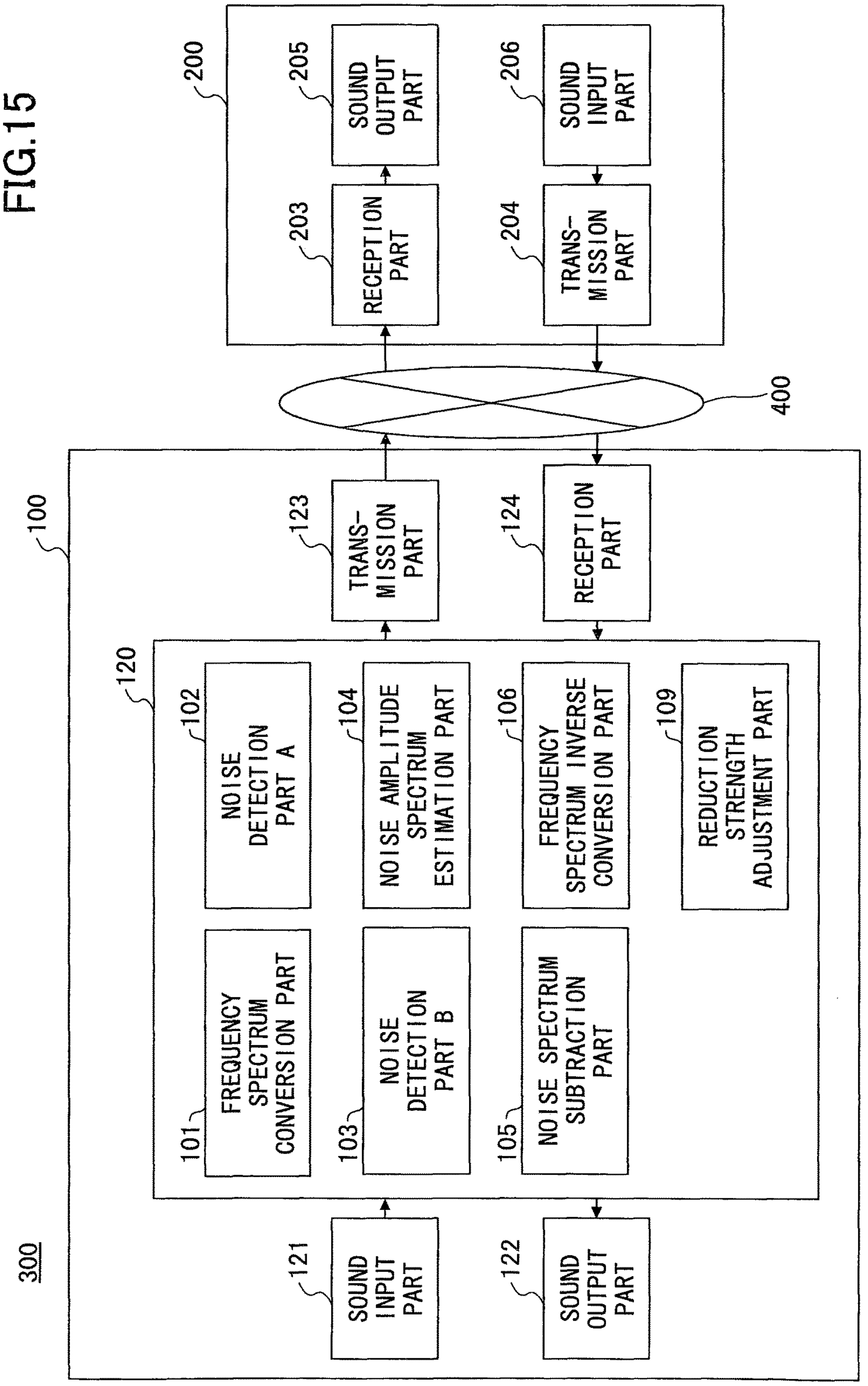
FIG. 15 is a block diagram illustrating a functional configuration of a processing system according to a fourth embodiment.

FIG. 15 is a block diagram illustrating a functional configuration of a processing system 300 according to the fourth embodiment. As shown in FIG. 15, the processing system 300 includes processing apparatuses 100 and 200 connected via a network 400.

The processing apparatus 100 includes a noise reduction part 120, a sound input part 121, a sound output part 122, a transmission part 123 and a reception part 124. The noise reduction part 120 includes a frequency spectrum conversion part 101, noise detection part A 102, a noise detection part B 103, a noise spectrum estimation part 104, a noise spectrum subtraction part 105, a frequency spectrum inverse conversion part 106 and a reduction strength adjustment part 109.

The sound input part 121, for example, collects a sound (voice or the like) occurring around the processing apparatus 100, generates a sound signal and outputs the sound signal to the noise reduction part 120. The sound output part 122 outputs a sound (a voice or the like) based on a sound signal inputted by the noise reduction part 120.

The transmission part 123 transmits data such as a sound signal from which noise is reduced by the noise reduction part 120 to another apparatus connected via the network 400, or the like. The reception part 124 receives data such as sound data from another apparatus connected via the network 400, or the like.

The noise reduction part 120 outputs a sound signal inputted to the sound input part 121 to the transmission part 123 after removing noise. Further, the noise reduction part 120 outputs a sound signal received by the reception part 124 to the sound output part 122 after removing noise.

In the processing apparatus 100 according to the fourth embodiment, the noise reduction part 120 includes the plural parts (noise amplitude spectrum estimation parts) which estimate the noise amplitude spectrum in the different methods, selects the suitable noise amplitude spectrum estimation part therefrom based on the noise detection result of the inputted sound, and estimates the noise amplitude spectrum Seno. Thus, regardless of the type and/or generation timing of the noise, the processing apparatus 100 can estimate the noise amplitude spectrum Seno of the noise included in the inputted sound with high accuracy, and output the sound signal obtained from reducing the noise from the inputted sound.

Further, in the processing apparatus 100, it is possible to adjust the level of reducing the noise from the inputted or received sound signal by the reduction strength adjustment part 109 of the noise reduction part 120. Thus, the user can set the appropriate noise reduction level according to the state of usage (situation) and use it.

The processing apparatus 200 connected to the processing apparatus 100 via the network 400 includes a reception part 203, a transmission part 204, a sound input part 205 and a sound output part 206.

The reception part 203 receives a sound signal transmitted from another apparatus connected via the network 400, or the like, and outputs the sound signal to the sound output part 205. The transmission part 204 transmits a sound signal inputted to the sound input part 206 to another apparatus connected via the network 400, or the like.

The sound output part 205 outputs a sound signal received by the reception part 203 to the outside. The sound input part 206, for example, collects a sound (a voice or the like) occurring around the processing apparatus 200, generates a sound signal and outputs the sound signal to the transmission part 204.

<Hardware Configuration of Processing System>

Figure 16:
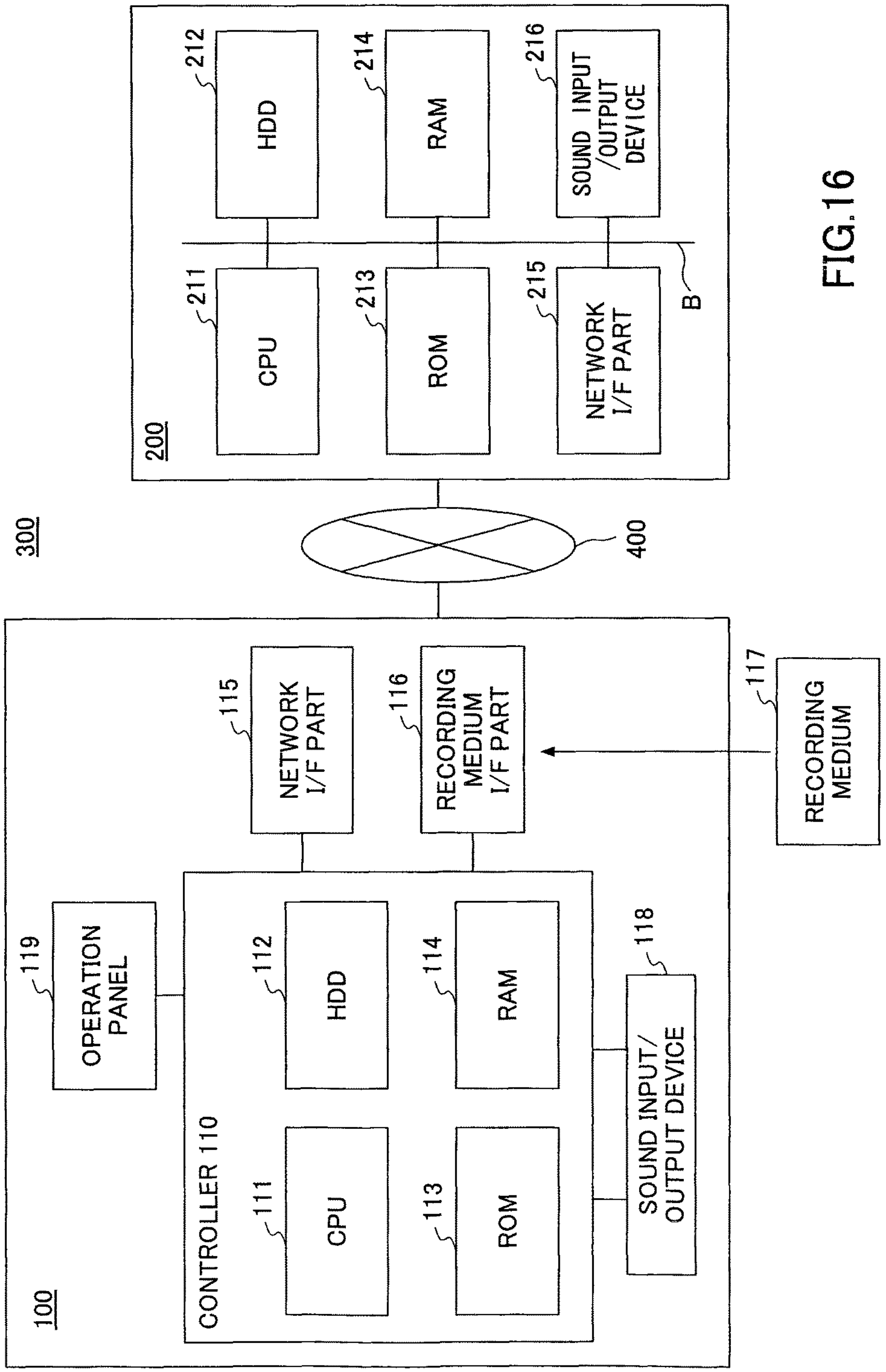
FIG. 16 illustrates a hardware configuration of the processing system according to the fourth embodiment.

FIG. 16 illustrates a hardware configuration of the processing system 300 according to the fourth embodiment.

The processing apparatus 100 includes a controller 110, a network I/F part 115, a recording medium I/F part 116, a sound input/output device 118 and an operation panel 119. The controller 110 includes a CPU 111, a HDD 112, a ROM 113 and a RAM 114.

The operation panel 119 is hardware including an input device such as buttons for receiving user's operations, an operation screen such as a liquid crystal panel having a touch panel function, and/or the like. On the operation panel 119, levels of reducing noise from an inputted sound signal inputted to the processing apparatus 100, or the like, are displayed in such a manner that the user can select one of the displayed levels. The reduction strength adjustment part 109 outputs a reduction strength adjustment signal Srs based on information inputted by the user to the operation panel 119.

In the processing system 300 according to the fourth embodiment, for example, the processing apparatus 100 transmits an inputted sound signal after removing noise to the processing apparatus 200. Thus, the user of the processing apparatus 200 can clearly catch the sound inputted from the processing apparatus 100. Further, the processing apparatus 100 can output a sound signal transmitted from the processing apparatus 200 after removing noise. Thus, the user of the processing apparatus 100 can clearly catch the sound transmitted from the processing apparatus 200. Thus, it is possible to carry out conversation, recording and/or the like by a clear sound, obtained from noise being reduced, between the users of the processing apparatus 100 and the processing apparatus 200 connected via the network 400.

Further, the noise reduction part 120 of the processing apparatus 100 has the reduction strength adjustment part 109 and can adjust the level of reducing the noise from the inputted sound signal. The level of reducing the noise to be adjusted by the reduction strength adjustment part 109 may be inputted via the operation panel 119 by the user of the processing apparatus 100 or may be controlled by a noise reduction processing signal being transmitted from the processing apparatus 200 to the processing apparatus 100. Thus, the user of the processing system 300 can set the appropriate level of reducing the noise from the sound signal.

It is noted that, for example, the number of the processing apparatuses included in the processing system 300 is not limited to that of the fourth embodiment. The processing system 300 may include three or more processing apparatuses. Further, the processing system 300 according to the fourth embodiment may be applied to a system in which, for example, plural PCs, PDAs, cellular phones, conference terminals and/or the like transmit/receive sound or the like thereamong.

Thus, the processing apparatuses and the processing systems have been described based on the embodiments. The functions of the processing apparatus 100 according to each of the embodiments can be realized as a result of a computer executing a program that is obtained from coding the respective processing procedures of each of the embodiments described above by a programming language suitable to the processing apparatus 100. Therefore, the program for realizing the functions of the processing apparatus 100 according to each of the embodiments can be stored in the computer readable recording medium 117.

Thus, by storing the program according to each of the embodiments in the recording medium 117 such as a flexible disk, a CD, a DVD, a USB memory or the like, the program can be installed therefrom in the processing apparatus 100. Further, since the processing apparatus 100 has the network I/F part 115, the program according to each of the embodiments can be installed in the processing apparatus 100 as a result of being downloaded via a telecommunication circuit such as the Internet.

According to the above-described embodiments, it is possible to provide a processing apparatus having a capability of estimating an amplitude spectrum of noise included in an inputted sound regardless of the type of the noise and the generation timing of the noise.

Thus, the processing apparatuses, each of which estimates a noise amplitude spectrum of noise included in an inputted sound signal, have been described by the embodiments. However, the present invention is not limited to these embodiments, and variations and modifications exist within the scope and spirit of the invention as described and defined in the claims shown below.

The present application is based on Japanese Priority Application No. 2012-104573, filed on May 1, 2012 and Japanese Priority Application No. 2013-032959, filed on Feb. 22, 2013, the entire contents of which are hereby incorporated by reference.

The invention claimed is:

1. A processing apparatus estimating a noise amplitude spectrum of noise included in a sound signal, the processing apparatus comprising:
   an amplitude spectrum calculation part configured to calculate an amplitude spectrum of the sound signal for each of frames obtained from dividing the sound signal into units of time; and
   a noise amplitude spectrum estimation part configured to estimate the noise amplitude spectrum of the noise detected from the frames, wherein
   the noise amplitude spectrum estimation part includes
      a first estimation part configured to estimate a noise amplitude spectrum based on a difference between the amplitude spectrum of a currently processed frame calculated by the amplitude spectrum calculation part and the amplitude spectrum of a previously processed frame occurring before the noise is detected by a noise detection part, and
      a second estimation part configured to estimate a noise amplitude spectrum based on an attenuation function calculated from noise amplitude spectra of a plurality of frames occurring after the noise is detected by the noise detection part.

2. The processing apparatus as claimed in claim 1, further comprising:
   an execution signal output part configured to output an execution signal to the first estimation part or the second estimation part for causing the first estimation part or the second estimation part to estimate the noise amplitude spectrum, based on an elapsed time from when the noise detection part detects the noise.

3. The processing apparatus as claimed in claim 2, further comprising:
   a noise amplitude spectrum storage part configured to store the noise amplitude spectrum estimated by the noise amplitude spectrum estimation part; and
   a noise amplitude spectrum storage control part configured to store, after the noise detection part detects the noise, the noise amplitude spectrum estimated by the noise amplitude spectrum estimation part in the noise amplitude spectrum storage part according to the elapsed time from when the noise detection part detects the noise.

4. The processing apparatus as claimed in claim 1, wherein
   the attenuation function obtained by the second estimation part is an exponential function.

5. The processing apparatus as claimed in claim 1, further comprising:
   an amplitude spectrum storage part configured to store the amplitude spectrum calculated by the amplitude spectrum calculation part; and
   an amplitude spectrum storage control part configured to temporarily store the amplitude spectrum calculated by the amplitude spectrum calculation part, and store the temporarily stored amplitude spectrum in the amplitude spectrum storage part when the noise has been detected.

6. The processing apparatus as claimed in claim 1, further comprising:
   a noise adjustment part configured to adjust a magnitude of the noise amplitude spectrum estimated by the first estimation part or the second estimation part.

7. The processing apparatus as claimed in claim 6, wherein
   the noise adjustment part is configured to adjust the magnitude of the noise amplitude spectrum by changing a value of a coefficient to be multiplied with the noise amplitude spectrum estimated by the first estimation part or the second estimation part.

8. The processing apparatus as claimed in claim 6, wherein
   the noise adjustment part is configured to adjust the magnitude of the noise amplitude spectrum by changing a value of a coefficient of the attenuation function obtained by the second estimation part.

9. A processing method of estimating a noise amplitude spectrum of noise included in a sound signal, the processing method comprising:
   calculating an amplitude spectrum of the sound signal for each of frames obtained from dividing the sound signal into units of time; and
   estimating the noise amplitude spectrum of the noise detected from the frames, wherein
   the estimating includes
      estimating a noise amplitude spectrum based on a difference between the amplitude spectrum of a currently processed frame calculated by the calculating and the amplitude spectrum of a previously processed frame occurring before the noise is detected by a noise detection apparatus, and
      estimating a noise amplitude spectrum based on an attenuation function calculated from noise amplitude spectra of a plurality of frames occurring after the noise is detected by the noise detection apparatus.

10. A non-transitory computer readable information recording medium storing therein a program for causing a computer to carry out a processing method of estimating a noise amplitude spectrum of noise included in a sound signal, the processing method comprising:
   calculating an amplitude spectrum of the sound signal for each of frames obtained from dividing the sound signal into units of time; and
   estimating the noise amplitude spectrum of the noise detected from the frames, wherein
   the estimating includes
      estimating a noise amplitude spectrum based on a difference between the amplitude spectrum of a currently processed frame calculated by the calculating and the amplitude spectrum of a previously processed frame occurring before the noise is detected by a noise detection apparatus, and
      estimating a noise amplitude spectrum based on an attenuation function calculated from noise amplitude spectra of a plurality of frames occurring after the noise is detected by the noise detection apparatus.

11. A processing apparatus, comprising:
   circuitry configured to
      calculate an amplitude spectrum of a sound signal for each of frames obtained from dividing the sound signal into units of time, and
      estimate a noise amplitude spectrum of noise detected from the frames, wherein
   the circuitry is configured to
      estimate a noise amplitude spectrum based on a difference between the amplitude spectrum of a currently processed frame calculated by the circuitry and the amplitude spectrum of a previously processed frame occurring before the noise is detected by a noise detection apparatus, and estimate a noise amplitude spectrum based on an attenuation function calculated from noise amplitude spectra of a plurality of frames occurring after the noise is detected by the noise detection apparatus.

* * * * *